US 9,342,213 B2

(12) United States Patent
Jung et al.

(10) Patent No.: US 9,342,213 B2
(45) Date of Patent: May 17, 2016

(54) MOBILE TERMINAL AND METHOD OF CONTROLLING THE SAME

(71) Applicant: LG ELECTRONICS INC., Seoul (KR)

(72) Inventors: Seulki Jung, Seoul (KR); Dongik Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/065,087

(22) Filed: Oct. 28, 2013

(65) Prior Publication Data

US 2014/0135069 A1 May 15, 2014

(30) Foreign Application Priority Data

Nov. 13, 2012 (KR) .......................... 10-2012-0128404

(51) Int. Cl.
*H04B 1/38* (2015.01)
*G06F 3/0481* (2013.01)
*G06F 17/30* (2006.01)
*G06F 3/041* (2006.01)

(52) U.S. Cl.
CPC ............ *G06F 3/04817* (2013.01); *G06F 3/041* (2013.01); *G06F 17/30663* (2013.01)

(58) Field of Classification Search
CPC .............. G06F 17/30663; G06F 3/041; G06F 3/04817; H04N 21/4316
USPC .......................................... 455/566; 705/411
See application file for complete search history.

(56) References Cited

U.S. PATENT DOCUMENTS

| | | | |
|---|---|---|---|
| 2004/0252887 A1* | 12/2004 | Lim et al. | 382/182 |
| 2005/0096093 A1* | 5/2005 | Schnurr | 455/566 |
| 2005/0156946 A1* | 7/2005 | Nakano | 345/619 |
| 2007/0054679 A1* | 3/2007 | Cho et al. | 455/466 |
| 2008/0071620 A1* | 3/2008 | Lowe | 705/14 |
| 2011/0047510 A1* | 2/2011 | Yoon | 715/835 |
| 2011/0210907 A1* | 9/2011 | Martin-Cocher et al. | 345/1.3 |
| 2011/0287814 A1* | 11/2011 | Lee et al. | 455/566 |
| 2012/0135784 A1* | 5/2012 | Lee et al. | 455/556.1 |
| 2012/0246600 A1* | 9/2012 | Abe | 715/853 |
| 2013/0013580 A1* | 1/2013 | Geller et al. | 707/706 |
| 2013/0144674 A1* | 6/2013 | Kim et al. | 705/7.19 |

FOREIGN PATENT DOCUMENTS

| | | |
|---|---|---|
| CN | 1575007 A | 2/2005 |
| CN | 1614614 A | 5/2005 |
| CN | 1622563 A | 6/2005 |
| CN | 1689068 A | 10/2005 |
| CN | 101651731 A | 2/2010 |

* cited by examiner

*Primary Examiner* — Mong-Thuy Tran
(74) *Attorney, Agent, or Firm* — Birch, Stewart, Kolasch & Birch, LLP

(57) ABSTRACT

Provided is a mobile terminal including a display unit to which first screen information is output, a memory in which content included in the first screen information is selectively stored, and a controller that, when second screen information different from the first screen information is output to the display unit, controls the display unit in such a manner that the content associated with the second screen information among the items of content stored in the memory is output to one region of the display unit.

15 Claims, 20 Drawing Sheets

MOBILE TERMINAL AND METHOD OF CONTROLLING THE SAME

CROSS-REFERENCE TO RELATED APPLICATION

Pursuant to 35 U.S.C. §119(a), this application claims the benefit of earlier filing date and right of priority to Korean Application No. 10-2012-0128404, filed on Nov. 13, 2012, the contents of which is incorporated by reference herein in its entirety.

BACKGROUND OF THE DISCLOSURE

1. Field of the Disclosure

The present invention relates to a mobile terminal that stores information that is output by a user.

2. Background of the Disclosure

In general, a terminal may be classified into a mobile (portable) terminal and a stationary terminal according to a moveable state. The mobile terminal may be also classified into a handheld terminal and a vehicle mount terminal according to a user's carriage method.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device. Various attempts have been made to implement complicated functions in such a multimedia device by means of hardware or software.

In recent years, various functions have been incorporated into the mobile terminal. Thus, the user can have access to a wealth of information using the mobile terminal. However, the user has difficulty remembering or recording in real time all information provided. The user experiences inconvenience in that he/she has to conduct a search in order to be provided with the information that is the same as or related to the previously provided information. Furthermore, there is concern that the user would not obtain the information that is the same as the previously provided information.

SUMMARY OF THE DISCLOSURE

Therefore, an aspect of the detailed description is to provide a mobile terminal that stores already-output information and selectively outputs the stored information.

To achieve these and other advantages and in accordance with the purpose of this specification, as embodied and broadly described herein, there is provided a mobile terminal including a display unit to which first screen information is output, a memory in which content included in the first screen information is selectively stored, and a controller that, when second screen information different from the first screen information is output to the display unit, controls the display unit in such a manner that the content associated with the second screen information among the items of content stored in the memory is output to one region of the display unit.

The mobile terminal may further include an extraction unit that extracts the content from the items of content included in the first screen information, based on predetermined extraction criteria, and a processing unit that analyzes the extracted content, structures the analyzed content by category, and processes the structured content in the form of a content pack.

In the mobile terminal, the processing unit may process one part of the second screen information into the content pack, using ontology.

In the mobile terminal, the extracted content may include data that are consistent with the second screen information.

In the mobile terminal, the controller may output at least one of the content packs and if a touch input is applied to one region of the display unit, may control the display unit in such a manner that the content pack is output.

In the mobile terminal, if the multiple content packs are formed from the first screen information, the controller may control the display unit in such a manner that at least one of the multiple content packs is selectively output according to the category of the second screen information.

In the mobile terminal, when the touch input is applied to a content window, the controller may control the display unit in such a manner that outputting of the content window is limited and one part of the content is output along with the second screen information.

In the mobile terminal, the multiple content packs that are formed from the multiple pieces of first screen information, each including the different content and that are associated with the second screen information may be stored in the memory, and the controller may control the display unit in such a manner that the multiple content packs are output.

In the mobile terminal, the controller may determine time-based outputting order in which the content packs are output to the display unit, based on predetermined outputting criteria.

In the mobile terminal, when the touch input is applied to the display unit, the controller may control the display unit in such a manner that the multiple content packs are output based on the outputting order.

In the mobile terminal, the predetermined outputting criteria may correspond to at least whether or not the content includes data that are consistent with one part of the second screen information, or whether or not an amount of the data and the second screen information are consistent with the category of the content.

In the mobile terminal, the controller may control the display unit in such a manner that the multiple content packs are output together.

In the mobile terminal, the controller may control the display unit in such a manner that the content is output to a content window that overlaps one region of the second screen information.

In the mobile terminal, a form of the content window may be changeable by a user's control command applied to the display unit or by user's setting.

In the mobile terminal, the second screen information may be defined as an execution screen of any one of multiple programs, and if the second screen information corresponding to a predetermined specific program among the multiple programs is output, the controller may perform control in such a manner that the content associated with the second screen information is output.

In the mobile terminal, if a touch input is applied to one region of the display unit on which data included in the second screen information are displayed, the controller may control the display unit in such a manner that the content associated with the data among the items of content stored in the memory is output.

In the mobile terminal, the content may include at least one of a letter, a symbol, voice, sound, an image, and a video image.

To achieve these and other advantages and in accordance with the purpose of this specification, as embodied and broadly described herein, there is provided a method of controlling a mobile terminal, including outputting first screen information to a display unit, selectively store content included in the first screen information, outputting second screen information different from the first screen information to the display unit, and outputting the content associated with the second screen information among the stored items of content to one region of the display unit.

In the method, the selective storing of the content included in the first screen information may include extracting the content from the first screen information, processing the extracted content, structuring the processed content and forming the structured content into a content pack and storing the content pack.

In the method, the outputting of the content associated with the second screen information to the one region of the display unit may include searching for at least the one item of content associated with the second screen information, determining time-based outputting order in which the content packs are output to the display unit, based on predetermined outputting criteria, and outputting the at least one item of content.

The method may further include applying a touch input to the display unit to which the content is output and switching the second screen information to the first screen information including the content.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated. A singular expression used in the specification includes a plural meaning unless it is distinctively disclosed.

A mobile terminal 100 according to the present disclosure may include a portable phone, a smart phone, a laptop computer, a digital broadcasting terminal, Personal Digital Assistants (PDA), Portable Multimedia Player (PMP), a navigation system, etc. The present disclosure discloses a mobile terminal, but it would be easily understood by those skilled in the art that the configuration according to the embodiment disclosed herein may be applicable to a stationary terminal, such as a digital TV and a desktop computer.

Figure 1:
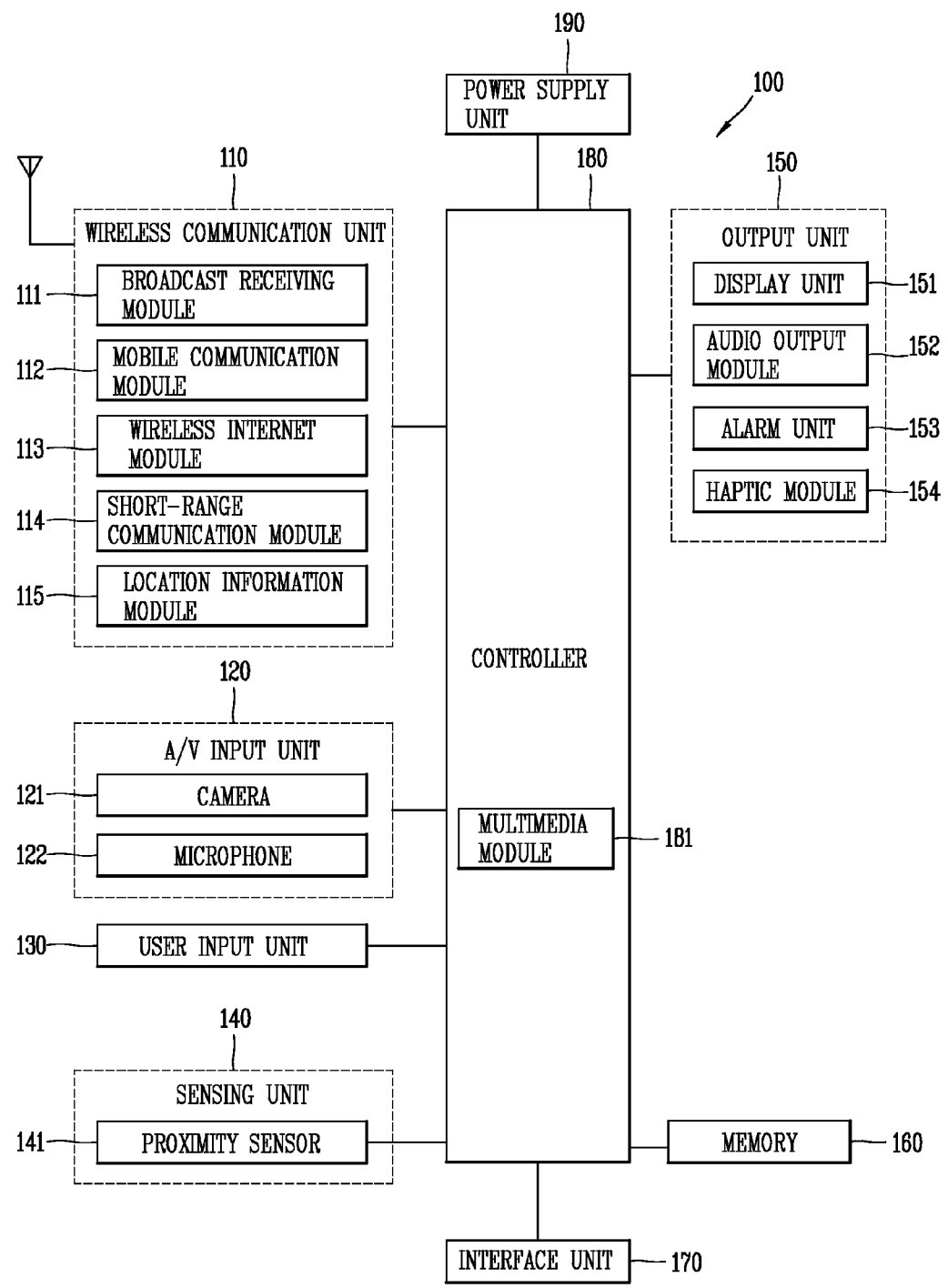
FIG. 1 is a block diagram illustrating a mobile terminal according to one embodiment of the present invention.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply unit 190, and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position information module 115 and the like.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcasting signals and/or broadcasting associated information received through the broadcast receiving module 111 may be stored in the memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various fonnats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position information module 115 denotes a module for sensing or calculating a position of a mobile terminal. An example of the position information module 115 may include a Global Position System (GPS) module.

Referring to FIG. 1, the A/V input unit 120 is configured to receive an audio or video signal. The A/V input unit 120 may include a camera 121, a microphone 122 or the like. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110. The camera 121 may be provided in two or more according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100, the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is open or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner. The output unit 150 may include the display unit 151, an audio output module 152, an alarm unit 153, a haptic module 154, and the like.

Referring to FIG. 1, a proximity sensor 141 may be arranged at an inner region of the mobile device 100 surrounded by the touch screen, or adjacent to the touch screen. The proximity sensor 141 refers to a sensor to sense the presence or absence of an object approaching to a surface to be sensed, or an object disposed adjacent to a surface to be sensed, by using an electromagnetic field or infrared rays without a mechanical contact. The proximity sensor 141 has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity of an object having conductivity (hereinafter, referred to as a "pointer") to the touch screen is sensed by changes of an electromagnetic field. In this case, the touch screen (touch sensor) may be categorized into a proximity sensor.

Hereinafter, for the sake of convenience of brief explanation, a behavior that the pointer is positioned to be proximate onto the touch screen without contact will be referred to as a "proximity touch", whereas a behavior that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor 141 senses a proximity touch, and a proximity touch pattern (e.g., proximity touch distance, proximity touch direction, proximity touch speed, proximity touch time, proximity touch position, proximity touch moving status, etc.). Information relating to the sensed proximity touch and the sensed proximity touch patterns may be output onto the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. Such video signal or audio signal may be output through the display unit 151 or the audio output module 152. Accordingly, the display unit 151 or the audio output module 152 may be categorized into part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a map data, phonebook, messages, still images, video, etc.) that are inputted or outputted. The memory 160 may store therein data on vibrations and sounds of various patterns output when a touch is input onto the touch screen.

The memory 160 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of these displays may be configured to be transparent so that outside may be seen therethrough, which may be referred to as a transparent display. A representative example of the transparent display may include a Transparent Organic Light Emitting Diode (TOLED), and the like. The rear surface portion of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of displays may be arranged on one surface integrally or separately, or may be arranged on different surfaces.

Here, if the display unit 151 and a touch sensor have a layered structure therebetween (will be referred to as 'touch screen'), the display unit 151 may be used as an input device rather than an output device. Such touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Figure 2A:
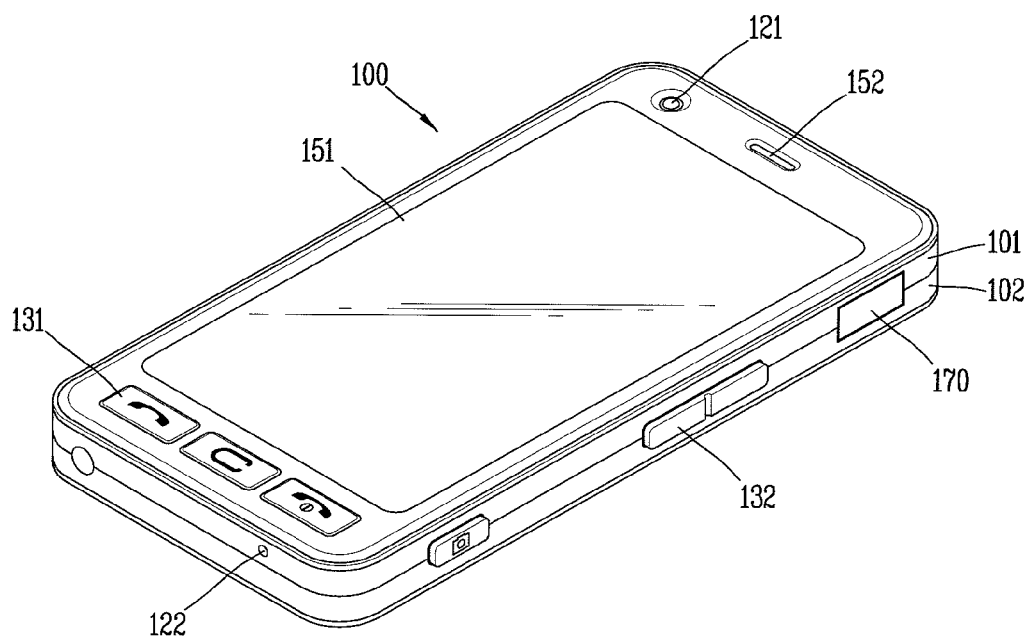
FIG. 2A is a perspective diagram illustrating the mobile terminal according to one embodiment of the present, when viewed from the front side.
Figure 2B:
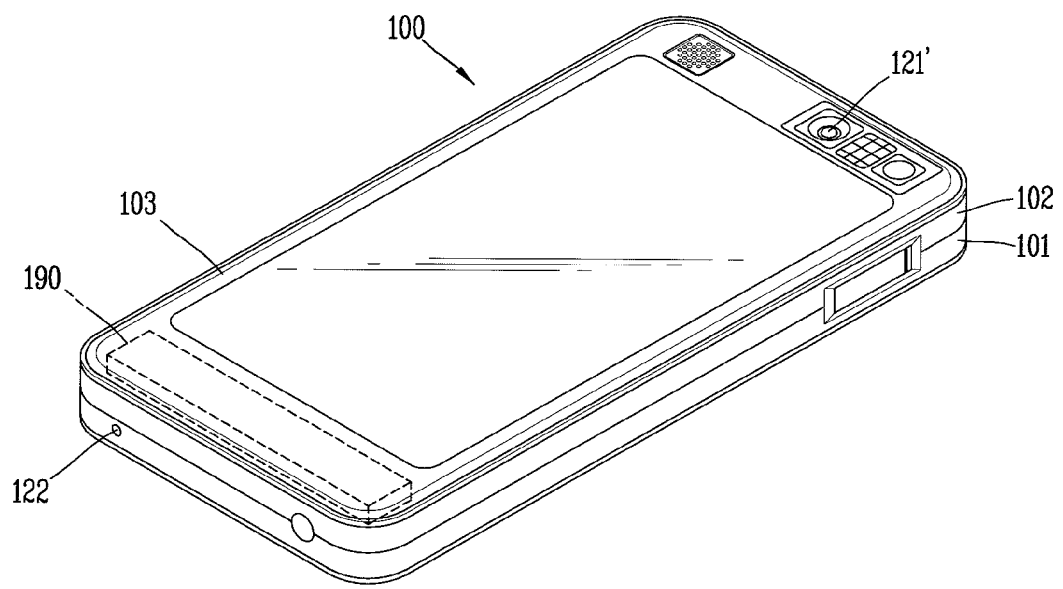
FIG. 2B is a perspective diagram illustrating the mobile terminal in FIG. 2A.

FIG. 2A is a view showing a front surface and one side surface of the mobile terminal 100 in accordance with the present invention, and FIG. 2B is a view showing a rear surface and another side surface of the mobile terminal 100 of FIG. 2A.

Referring to FIGS. 1, 2A and 2B, the mobile terminal 100 disclosed herein is provided with a bar-type terminal body. However, the present invention may not be limited to this, but also may be applicable to various structures such as a slide type, a folder type and a swing type, in which two and more bodies are combined with each other in a relatively movable manner. Further, the mobile terminal 100 of the present invention may be applicable to any portable electronic device having a camera and a flash, e.g., a portable phone, a smart phone, a notebook computer, a digital broadcasting terminal, a Personal Digital Assistants (PDA), a Portable Multimedia Player (PMO), etc.

The terminal body includes a case (casing, housing, cover, etc.) forming the appearance of the terminal. In this embodiment, the case may be divided into a front case 101, a rear case 102, and a battery cover 103 for covering the rear case 102 and forming the appearance of the terminal body. Various electronic components are incorporated into a space formed between the front case 101 and the rear case 102. The cases may be formed by injection-molding a synthetic resin or may be also formed of a metal, for example, stainless steel (STS), titanium (Ti), or the like.

A display unit 151, a first audio output module 152, a user input unit 131, a front camera 121 and a proximity sensor (not shown) may be disposed on a front surface of the terminal body.

The display unit 151 may include at least one of a liquid crystal display (LCD), an organic light emitting diode (OLED) display, e-paper, etc. for displaying information in a visual manner. The display unit 151 may include a touch sensing means to receive a control command by a touch method. The display unit 151 including a touch sensing means will be referred to as 'touch screen.' When a touch is made to any one place on the touch screen, the touch sensing means may be configured to sense this touch and enter the content corresponding to the touched place. The content entered by a touch method may be a text or numerical value, or a menu item capable of indication or designation in various modes. The touch sensing means may be formed with transparency to allow visual information displayed on the display unit 151 to be seen, and may include a structure for enhancing the visibility of a touch screen at bright places. Referring to FIG. 2a, the display unit 151 occupies a most portion of the front surface of the front case 101.

The first audio output module 152 may be implemented in the form of a receiver for transferring voice sounds to the user's ear or a loud speaker for outputting various alarm sounds or multimedia reproduction sounds.

The front camera 121 processes video frames such as still or moving images obtained by the image sensor in a video call mode or capture mode. The processed video frames may be displayed on the display unit 151.

The image frames processed by the front camera 121 may be stored in the memory 160 or transmitted via the wireless communication unit 110. Two or more front cameras 121 may be provided according to the configuration of the mobile communication terminal.

The user input unit 131 is manipulated to receive a command for controlling the operation of the mobile terminal 100, and may include a plurality of manipulation units. The manipulation units may be referred to as manipulating portions, and may include any type of ones that can be manipulated in a user's tactile manner.

For instance, the user input unit 131 may be implemented a dome switch, a touch screen or a touch pad for inputting commands or information by a user's push or touch operation. Alternatively, the user input unit 131 may be implemented as a jog wheel, a jog switch, and the like for rotating keys. Commands inputted through the user input unit 131 may be variously set. The user input unit 131 is configured to input commands such as START, END and SCROLL.

A proximity sensor (not shown) may be arranged at an inner region of the mobile device 100 surrounded by the touch screen formed at the display unit 151, or adjacent to the touch screen. The proximity sensor refers to a sensor to sense the presence or absence of an object approaching to a surface to be sensed, or an object disposed adjacent to a surface to be sensed, by using an electromagnetic field or infrared rays without a mechanical contact. The proximity sensor has a longer lifespan and a more enhanced utility than a contact sensor.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field.

A side key 132, an interface unit 170, an audio input unit 122, an ear jack (not shown) for inserting an earphone plug, etc., are arranged on the side surface of the front case 101.

The side key 132 may be referred to as 'manipulating unit', and may be configured to input commands for controlling the operation of the mobile terminal 100. The side key 132 may include any type of ones that can be manipulated in a user's tactile manner. Contents input by the side key 132 may be variously set. For instance, the side key 132 may receive commands such as controlling the camera units 121 and 121', controlling the size of a sound output from the audio output module 152, and converting a mode of the display unit 151 into a touch recognition mode.

The audio input unit 122 may be implemented as a microphone, for instance, so that a user's voice, other sound, etc. can be input.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module.

A power supply unit 190 and a second camera 121' are arranged on the rear surface of the terminal body.

A flash 124 and a mirror 123 may be disposed close to the rear camera 121'. The flash 124 operates in conjunction with the rear camera 121' when taking a picture using the rear camera 121'.

The mirror 123 can cooperate with the rear camera 121' to allow a user to photograph himself in a self-portrait mode.

The rear camera 121' faces a direction which is opposite to a direction faced by the front camera 121, and may have different pixels from those of the front camera 121.

For example, the front camera 121 may operate with relatively lower pixels (lower resolution). Thus, the front camera 121 may be useful when a user can capture his face and send it to another party during a video call or the like. On the other hand, the rear camera 121' may operate with a relatively higher pixels (higher resolution) such that it can be useful for a user to obtain higher quality pictures for later use. The front camera 121 and the rear camera 121' may be installed at the terminal body so as to rotate or pop-up.

The controller 180 of the mobile terminal 100 according to the present invention controls the memory 160 in such a manner that at least one item of content that is output to the display unit 151 is stored. In addition, when other information is output to the display unit 151, the controller 180 controls the display unit 151 and the memory 160 in such a manner that at least one item of content associated with that information is output. A control method of providing the user with the content stored in the memory 160 is described below.

Figure 3A:
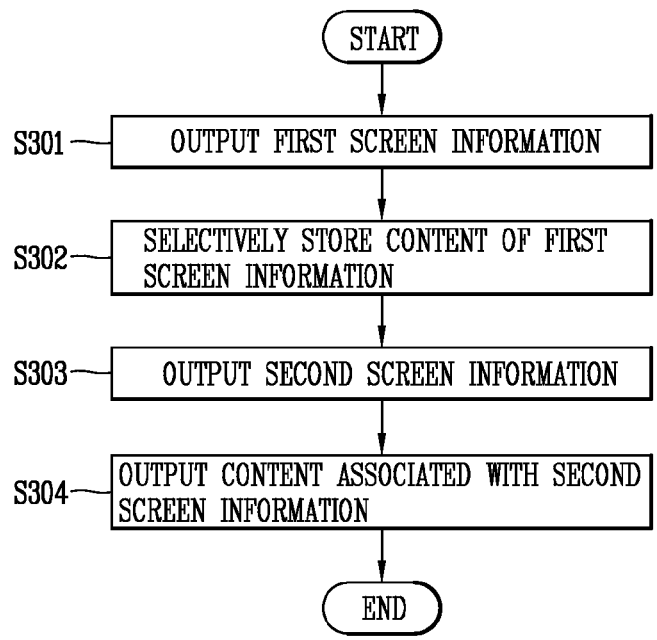
FIG. 3A is a flowchart for describing a method of controlling the mobile terminal according to one embodiment of the present invention.
Figure 3B:
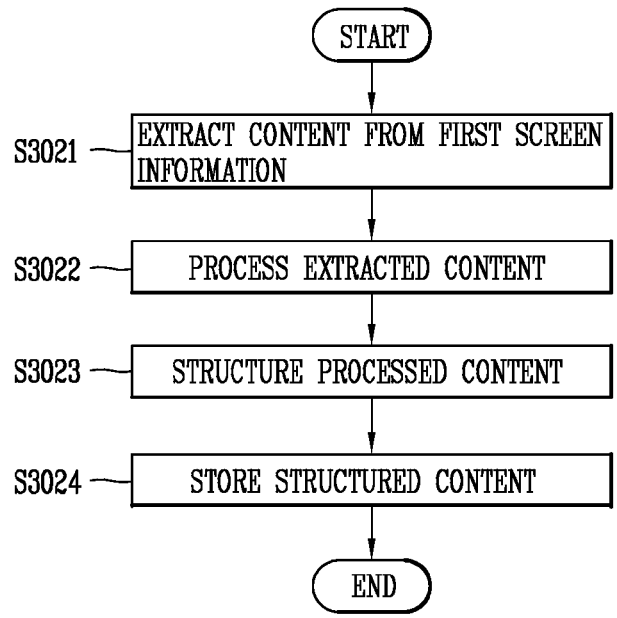
FIG. 3B is a flowchart for describing a control method of selectively storing first screen information.
Figure 4A:
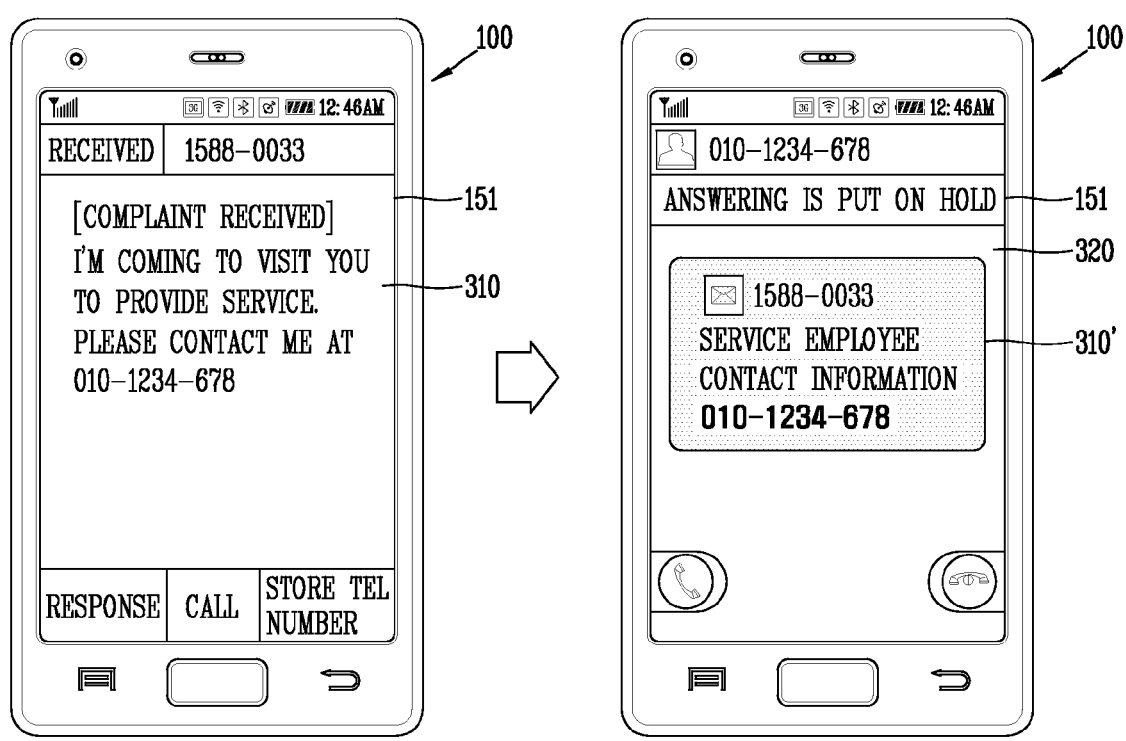
FIG. 4A to 4D are diagrams for describing control methods according to various embodiments in FIGS. 3A and 3B.

FIG. 3A is a flowchart for describing a method of controlling the mobile terminal 100 according to one embodiment of the present invention. FIG. 3B is a flowchart for describing a control method of selectively storing first screen information. FIG. 4A is a diagram for describing the control method according to one embodiment in FIGS. 3A and 3B.

A control method of outputting a stored text message associated with outgoing call information when the mobile terminal 100 is in a telephone call mode is described referring FIGS. 3A, 3B, and 4A.

First screen information 310 is output to the display unit 151 (S301). The first screen information 310 includes at least one item of content.

The first screen information 310 includes all screen information displayed on the display unit 151, such as a web browser screen controlled by the user, which is provided over a cable or wireless communication network, receiving and transmitting screens of the text message, a memo screen that receives a user's input through the mobile terminal 100, an image screen that is captured by the camera, and an execution screen of an application. In addition, the content here means various pieces of information or contents that are provided in the form of letters, symbols, voice, sound, images, or video images.

In addition, the content may include information that is not output directly from the mobile terminal 100 and thus is currently unrecognizable to the user. For example, the content includes a web page URL that is not output to the display unit 151, a link address that is included in the corresponding information and thus is connected to other screen information, and tag information that is added to images and the like, but is not activated.

Referring to FIG. 4A, the first screen information 310 is the receiving screen of the text message. The first screen information 310 includes the contents of the text message, "'COMPLAINT RECEIVED.' I'M COMING TO VISIT YOU TO PROVIDE SERVICE. PLEASE CONTACT ME AT 010-1234-678" and the information on the mobile terminal that transmits the text message, "1588-0033." In addition to these, the first screen information 310 includes a graphic image in the text form into which to input the word "RECEIVED" indicating that the text message is received and control commands such as "RESPOND, "CALL," and "STORE TEL NUMBER, and others.

All words and images and others included in the first screen information 310 correspond to the content included in the first screen information 310. In addition, a wireless communication address, such as a telephone number, which is not displayed on the display unit 151, but is included in a number relating to the mobile terminal transmitting the message described above and in the text message, also corresponds to the content of the first screen information.

The content included in the first screen information 310 is selectively stored in the memory 160 of the mobile terminal 100. The memory 160 corresponds to a memory (160) device in the various forms, which is built into the mobile terminal 100. The memory (160) device and the like may operate in association with the web storage.

FIG. 3B is a flowchart for describing a control method of selectively storing the first screen information. First, the content is extracted from the first screen information (S3021). When the mobile terminal 100 receives the message including the multiple items of content, at least one item of content among the multiple items of content is stored. In order to selectively store the content, the multiple items of content are analyzed, and the content to be stored in the memory 160 is extracted according to predetermined extraction criteria.

The telephone number and the like that are included in the first screen information 310 are extracted. For example, the controller 180 controls the memory 160 in such a manner that a sender number of the message, a representative name matching with the sender number stored in the mobile terminal 100, a telephone number included in the text message and the like are extracted.

A telephone number, an account number, a street number, and a password, each of which includes numerals, are not easy to remember at first sight and preferably are set to a high priority in the extraction criteria of the content. In addition, the controller 180 performs control in such a manner that associated items of content that can describe the numbers described above, respectively, are extracted along with the numbers described above.

On the other hand, the controller 180 controls the memory 160 in such a manner that numerals sequentially arranged in various patterns are recognized as a telephone number and is stored as such. For example, although multiple numerals do not include a hyphen ("-") between them, they are recognized as a telephone number. If a country code is prefixed to a telephone number pattern and at least one hyphen ("-") is included between numerals, the controller 180 controls the memory 160 in such a manner that this is recognized as a telephone number and is stored as such.

In addition, the controller 180 controls the memory 160 in such a manner that key words included in the contents of the text message are extracted. The key word corresponds to a word, a phrase, or a clause that is extracted from a title and contents in order to express the recorded contents.

For example, referring to FIG. 4A, since the text message corresponds to the contents to the effect that a service employee pays a visit to a customer to handle the complaint in question, the key word of the text message corresponds to the "service employee's visit to the customer." Therefore, the controller 180 controls the memory 160 in such a manner that the key word of the first screen information is extracted and is stored.

As an information extraction algorithm with which the key word is extracted, at least one of text-mining, context-cognition, estimate, clustering (k-means algorithm), natural language processing (NLP), semantic-network, syllogism, temporal-reasoning, and theorem-proving can be employed, but this does not impose any limitation. Various algorithms can be employed for the extraction of the key word.

For example, if the first screen information is a message receiving screen, the memory 160 extracts at least one of words that can be used as a representative word, as a name of a contact point to be matched with the telephone number, from the telephone number and message of the sender, and extracts a distinctive key word of the message into which to input a control command to output the key words in the message and the original text of the message.

Thereafter, the extracted content is processed, and the extracted content as processed is structured (S3022 and S3023). The memory 160 includes a processing unit that processes the extracted content as a content pack.

The processing unit analyzes the content. The processing unit analyzes properties of and a category of each of the multiple items of content and designates representative content. In addition, the processing unit draws the representative content from the items of content and performs a process of determining a relationship, regularity, and the like among the items of content.

In addition, the processing unit processes the content as in the form of information that can represent the items of content in terms of concept. The processing unit performs the process using ontology.

The ontology means a formal and explicit specification with respect to shared conceptualization. That is, the ontology is a kind of dictionary made up of words and relationships among them and is a concept that defines a specific term or a relationship among the terms. Therefore, a combination of words that can present one part of the content included in the first screen information in terms of conception is generated using the ontology.

For example, "seller" is generated as a result of performing processing on words "I offer," "I sell," and "I deliver." "SERVICE EMPLOYEE CONTACT INFORMATION" is generated as a result of performing the processing on words "PROVIDE SERVICE," and "CONTACT ME," and is stored as such.

The content processed by the processing unit is structured and thus is created in the form of a content pack. The processed items of content are grouped by relevance into categories. The contact pack is a combination of items of content that belong to the same category.

The controller 180 performs the control in such a manner that at least one content pack is created using the multiple items of content included in the second screen information and is stored in the form of the content pack (S3024).

When the first screen information is output, the content pack of the first screen information is stored, and then a second screen information different from the first screen information is output to the display unit 151 (S303).

Like the first screen information 310, the second screen information 320 is not limited in type. For example, the second screen information 320 includes the web browser screen, the receiving and transmitting screens of the text message, the memo screen that receives the user's input, a telephone call mode screen, and the like. The second screen information 320 includes letters, symbols, voice, sound, images, video images.

If a telephone call arrives from the external terminal through the wireless communication unit 110 (FIG. 4A), the second screen information 320 corresponds to a telephone call receiving screen. The telephone call receiving screen includes a telephone number 010-1234-678 of the external mobile terminal, an image representing the external mobile terminal, a representative name of the external mobile terminal, and status information (ANSWERING IS PUT ON HOLD) on the external mobile terminal. In addition, the graphic image to which a touch input activating communication with the external terminal is applied is output to the display unit 151.

The content associated with the second screen information 320 is output (S304). The content associated with the second screen information 320 is the content pack that is extracted from the first screen information 310 and is processed.

The controller 180 searches the items of content stored in the memory 160 for the content associated with the second screen information 320 according to user's control command and setting.

The content pack including the content substantially the same as or similar to that of the second screen information 320 may be searched for. The content substantially the same as or similar to that of the second screen information 320 means that it is substantially the same as or similar to at least one of the text, the image, the sound, the moving image and the like included in the second screen information 320. Alternatively, the content that is the same in concept as that of the second screen information 320 can be included using the ontology. This is true for the content that is the same as or similar to that of the second screen information 320 in terms of category, information arrangement, or color impression (if the content is an image).

The extent to which the content is associated with that of the second screen information 320 and search criteria are limited by the user's setting. In addition, the search criteria are set as having different priority levels. For example, an order of priority is a numeral included in a sentence, and a proper noun, a noun, a verb, and an adjective that make up the sentence. The setting is provided in such a manner that the search of the content is conducted in this order of priority.

Referring to FIG. 4A, the content associated with the second screen information 320 includes numerals 010-1234-678 that is the same as the telephone number 010-1234-678 included in the first screen information 310. As described above, numerals are recognized as a telephone number although a hyphen ("-") is not present between numerals. Thus, even though numerals included in the first screen information 310 are expressed as "0101234678," these are searched for as the content associated with the second screen information 320.

The content pack including the telephone number 010-1234-678 includes an icon indicating that the message is a text message and words "SERVICE EMPLOYEE CONTACT INFORMATION." The content pack provides the fact that 010-1234-678 is an item of information extracted from the text message and the contents to the effect that 010-1234-678 is the contact information on the service employee.

When the content pack associated with the second screen information 320 is searched for, the controller 180 controls the display unit 151 in such a manner that the content that is extracted from the first screen information 310 including the telephone number 010-1234-678 of the external mobile terminal and is stored in the memory 160 is displayed.

The controller 180 controls the display unit 151 in such a manner that the content of the first screen information 310 outputs a content window 310' overlapping the second screen information 320. That is, the content window 310' is output in such a manner as to overlap one part of the second screen information 320.

At least one part of the first screen information 310, as is or in the processed form, is displayed on the content window 310'. For example, the content window 310' the icon indicating the text message and words "SERVICE EMPLOYEE CONTACT INFORMATION."

In addition, the controller 180 controls the display unit 151 in such a manner that highlighting processing is performed on the word corresponding to the second screen information 320 among words included in the context pack and the highlighting-processed word is displayed. For example, among words included in the content window 310' in FIG. 4A, numerals 010-1234-678 is the same as the telephone number 010-1234-678 included in the first screen information 310 is displayed in bold type. Accordingly, the user easily recognizes which relationship the content displayed on the display unit 151 has with the second screen information 320.

The controller 180 not only controls the display unit 151 in such a manner that associated content is provided as visual information, but also controls the speaker in such a manner that the content is converted into an audio signal and the audio signal is provided to the user.

According to the embodiment in FIG. 4A, when a wireless signal is received from a telephone number not registered with the mobile terminal 100 through the wireless communication unit 110 of the mobile terminal 100, the controller 180 controls the display unit 151 in such a manner that that telephone number is displayed and controls the display unit 151 in such a manner that the memory 160 is searched for information associated with that telephone number and the associated information is output.

Therefore, if the user forgot the telephone number provided before, he/she can be provided back in real time with the information on the telephone number provided before. In addition, because the user can receive a wireless signal through the wireless communication unit 110 and at the same time, be provided with the information on that telephone number, he/she experiences reduced inconvenience in that the search does not need to be reconducted.

The controller 180 controls the storage unit in such a manner that all items of content provided to the user through the mobile terminal 100 are stored. Therefore, not only the first screen information 310, but also the content included in the second screen information 320 is selectively stored.

Figure 4B:
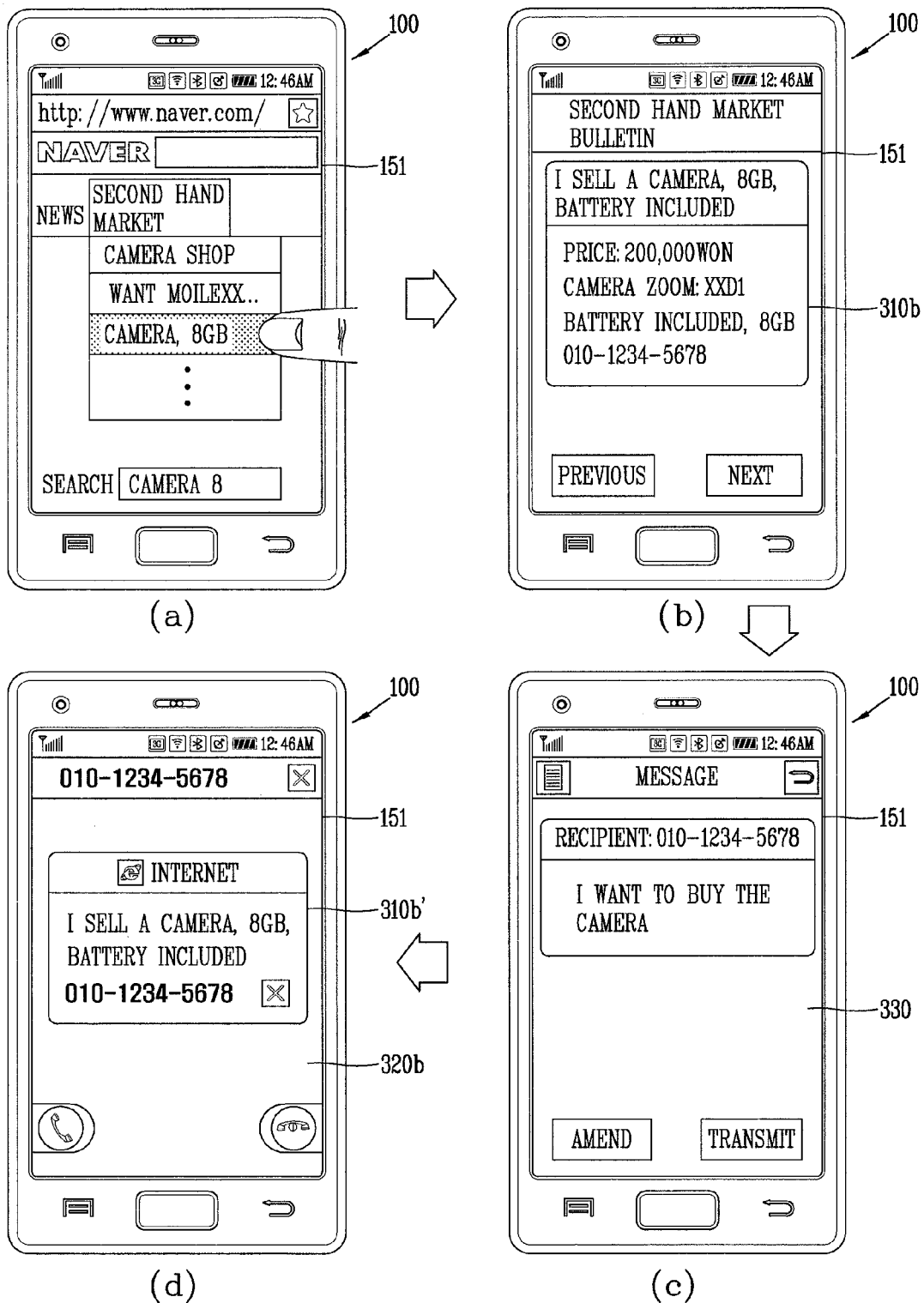

FIGS. 4B(a) to 4B(d) are diagrams for describing a control method in FIG. 3 according to another embodiment. A control method of providing the content that the user searches for using the web browser is described referring to FIGS. 4B(a) to 4B(d). A control method of storing and outputting the content is substantially the same as the control method in FIG. 4A except that the content is provided through the web browser. The description of what is common to FIG. 4A and FIGS. 4B(a) to 4B(d) is omitted referring to FIGS. 3A and 3B and FIG. 4A.

Referring to FIGS. 4B(a) and 4B(b), the user searches for information that he/she wants to obtain using the Internet web browser. For example, it is assumed that the user searches the bulletin board of a second hand market for a second hand camera equipped with a memory device with a memory capacity of 8 Gb.

Based on the user's touch input applied to the display unit 151, the controller 180 controls the display unit 151 in such a manner that a first screen information 310b is output. A notice titled "I SELL CAMERA, 8 GB, BATTERY INCLUDED," which includes sub-information, is output to the first screen information 310b. For example, the contents of the notice include "PRICE", "CAMERA ZOOM LENS", "BATTERY INCLUDED", "8 GB", and "TEL NUMBER 010-1234-5678."

FIG. 4B(c) is a diagram illustrating a third screen information 330, a message transmitting screen for transmitting a text message using the first screen information 310b. Although not illustrated in the drawing, the controller 180 controls the memory 160 in such a manner that the content included in the third screen information 330 is selectively stored.

The transmits a text message "I WANT TO BUY A CAMERA" at the telephone number described above. A control method is described in which if a wireless telephone call signal is received thereafter from the external mobile terminal with the telephone number, the stored content is output.

FIG. 4B(d) is a diagram illustrating a second screen information 320b that is displayed on the display unit 151 when the wireless telephone call signal is received from the external mobile terminal through the wireless communication unit 110. The second screen information 320b includes the telephone number 010-1234-5678 of the external mobile terminal.

The controller 180 controls the memory 160 in such a manner that the memory 160 in which the items of content are stored is searched for the content associated with the second screen information 320b. In addition, the controller 180 controls the display unit 151 in such a manner that the content pack including the content described above is output along with the second screen information 320b.

For example, a content window 310b' on which to display the content pack including the telephone number 10-1234-5678 is output in such a manner to overlap the second screen information 320b.

While the wireless communication unit 110 receives the wireless telephone call signal, the controller 180 controls the display unit 151 in such a manner that the content window 310b' is displayed on the display unit 151 in such a manner as to overlap the second screen information 320b.

In addition, the controller 180 controls the display unit 151 in such a manner that the highlighting processing is performed on the content associated with the second screen information 320b, that is, "010-1234-5678" and the highlighting-processed "010-1234-5678" is output.

Accordingly, while outputting the associated second screen information, the user is provided back with the content that he/she has been provided through the search and selection using the web browser, but did not store or cannot remember.

Therefore, according to the present embodiment, even though the information displayed on a web browser window on which a wealth of information is displayed is not stored, the user can be provided back that information if the associated information is output.

Figure 4C:
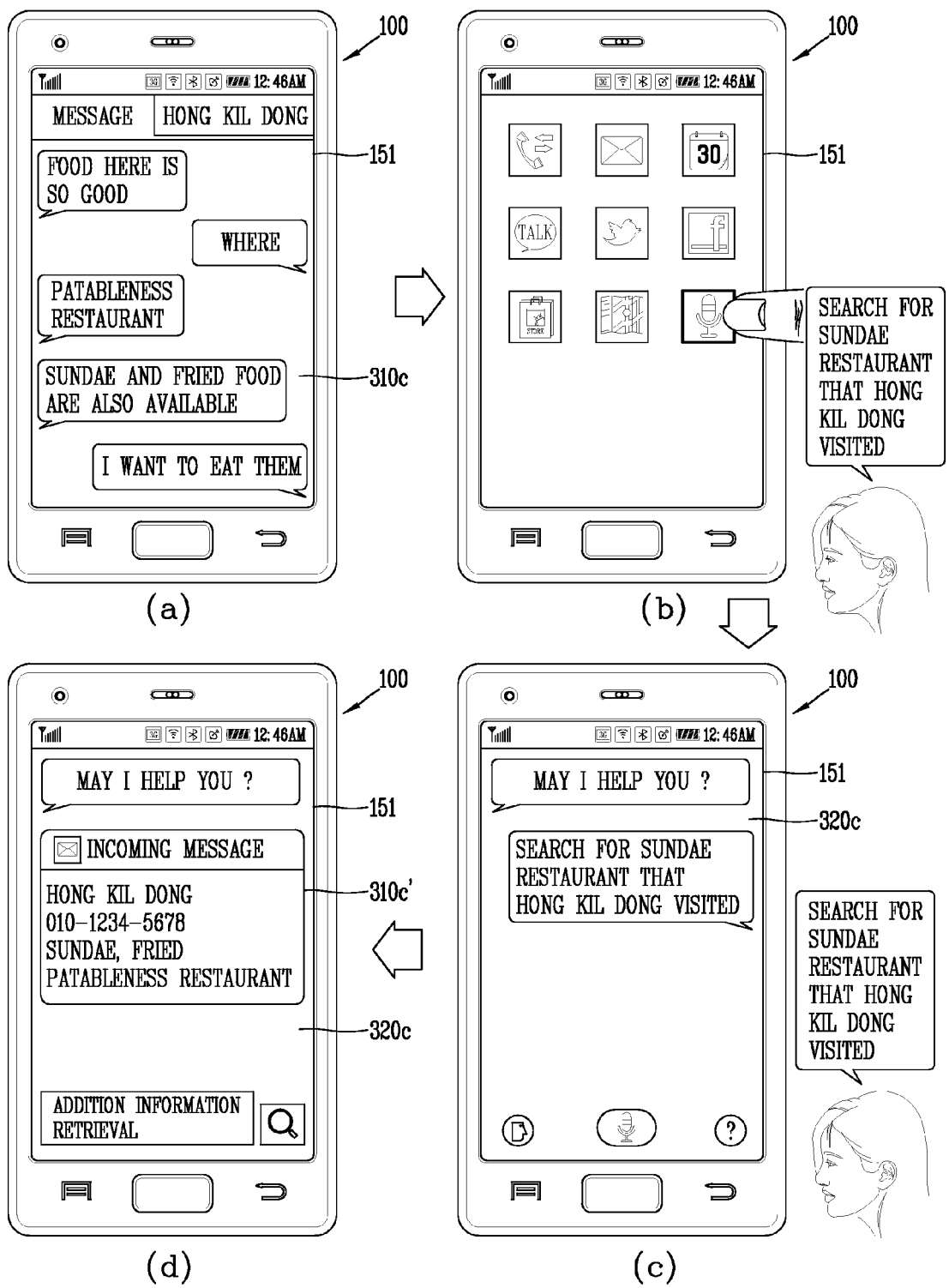

FIGS. 4C(a) to 4C(d) are diagrams for describing a control method in FIGS. 3A and 3B according to another embodiment. Referring to FIGS. 4C(a) to 4C(d), a method is described in which the control is performed in such a manner that the text message transmitted to and from the external mobile terminal through the wireless communication unit 110 is selectively stored and is output later based on a user's search command.

A control method of storing and outputting the content is substantially the same as the control method in FIG. 4A except that the control is performed based on the text information transmitted to and from the external mobile terminal and the user's search command. The description of what is common to FIG. 4A and FIGS. 4C(a) to 4C(d) is omitted referring to FIGS. 3A and 3B and FIG. 4A.

Referring to FIG. 4C(a), a first screen information 310c includes the multiple words transmitted to and from the external mobile terminal through the wireless communication unit 110 and information on the representative name indicating the external mobile terminal.

For example, the controller 180 controls the display unit 151 in such a manner that words, such as "FOOD HERE IS SO GOOD," "WHERE," "PALATABLENESS RESTAURANT," "SUNDAE AND FRIED FOOD ARE ALSO AVAILABLE," and "I WANT TO EAT THEM" are sequentially output based on the wireless signal transmitted and received through the wireless communication unit 110 and the touch input by the user of the mobile terminal 100.

Although not illustrated in the drawings, the controller 180 controls the memory 160 in such a manner that the content of the first screen information 310c is selectively extracted, the extracted content is processed, and the processed content is stored.

Referring to FIGS. 4C(b) and 4C(c), the controller 180 executes an artificial intelligence system, based on the user's control command.

The artificial intelligence system here enables a computer to simulate the knowledge and analytical skills of a human expert, based on an application technology of the knowledge engineering. Generally, the artificial intelligence system means a system that when a problem-solving sequence used by human beings is programmed into the computer, searches for a solution by processing the data according to this sequence.

For example, when the artificial intelligence is applied to a search program installed in the mobile terminal 100 and the control command in the form of a human language is input, the artificial intelligence system is realized in the mobile terminal 100 in such a manner as to perform not only computation but also step-by-step reasoning with respect to the control command to come up with a solution corresponding to the control command. For example, the user's commands, such as those to execute a search function, to execute and run an application, to execute wireless communication, and to change setting of the mobile terminal 100, are analyzed and are performed.

FIG. 4C(c) is a diagram illustrating an execution screen of the artificial intelligence system to which the artificial intelligence system is applied, according to one embodiment. For example, an execution screen 331 includes words "MAY I HELP YOU." A voice control command "Search for Sundae Restaurant that Hong Kil Dong visited" is input into the mobile terminal 100. The controller 180 controls the display unit 151 in such a manner that words corresponding to the voice control command are output.

On the execution screen of the artificial intelligence system, the screen information including words "SEARCH FOR SUNDAE RESTAURANT THAT HONG KIL DONG VISITED" is defined as a second screen information 320c. The artificial intelligence system recognizes the meaning of words "SEARCH FOR" and analyzes "SUNDAE RESTAURANT THAT HONG KIL DONG VISITED" to designate an object to be searched for.

The controller 180 controls the display unit 151 in such a manner that the memory 160 in which the items of content are stored is searched for the content that is included in the second screen information 320c and is associated with words corresponding to the voice control command and the content pack including the content is output along with the second screen information 320c.

According to the present embodiment, the content pack includes the telephone number "010-1234-5678" of the external mobile terminal that transmits some words in the content of the conversation, and "HONG KIL DONG, SUNDAE, FRIED FOOD, PALATABLENESS RESTAURANT" that are extracted from the memory 160 using the key words.

Because voice language or words corresponding to "HONG KIL DONG, SUNDAE, FRIED FOOD, PALATABLENESS RESTAURANT" included in the voice control command correspond to words that, determined as the key words, are extracted, the controller 180 controls the display unit 151 and the memory 160 using the content pack.

According to the present embodiment, since the information that is input by the user and the information that is transmitted from the external mobile terminal with respect to this are processed in the form of the content pack, the user can be provided with the information that is not structured and is distributed or with the pieces of information that are sequentially provided over time, as one contact pack, that is, as the processed information.

In addition, since the artificial intelligent system searches for the associated content using several pieces of information that the user remembers, the information can be provided back more easily.

Figure 4D:
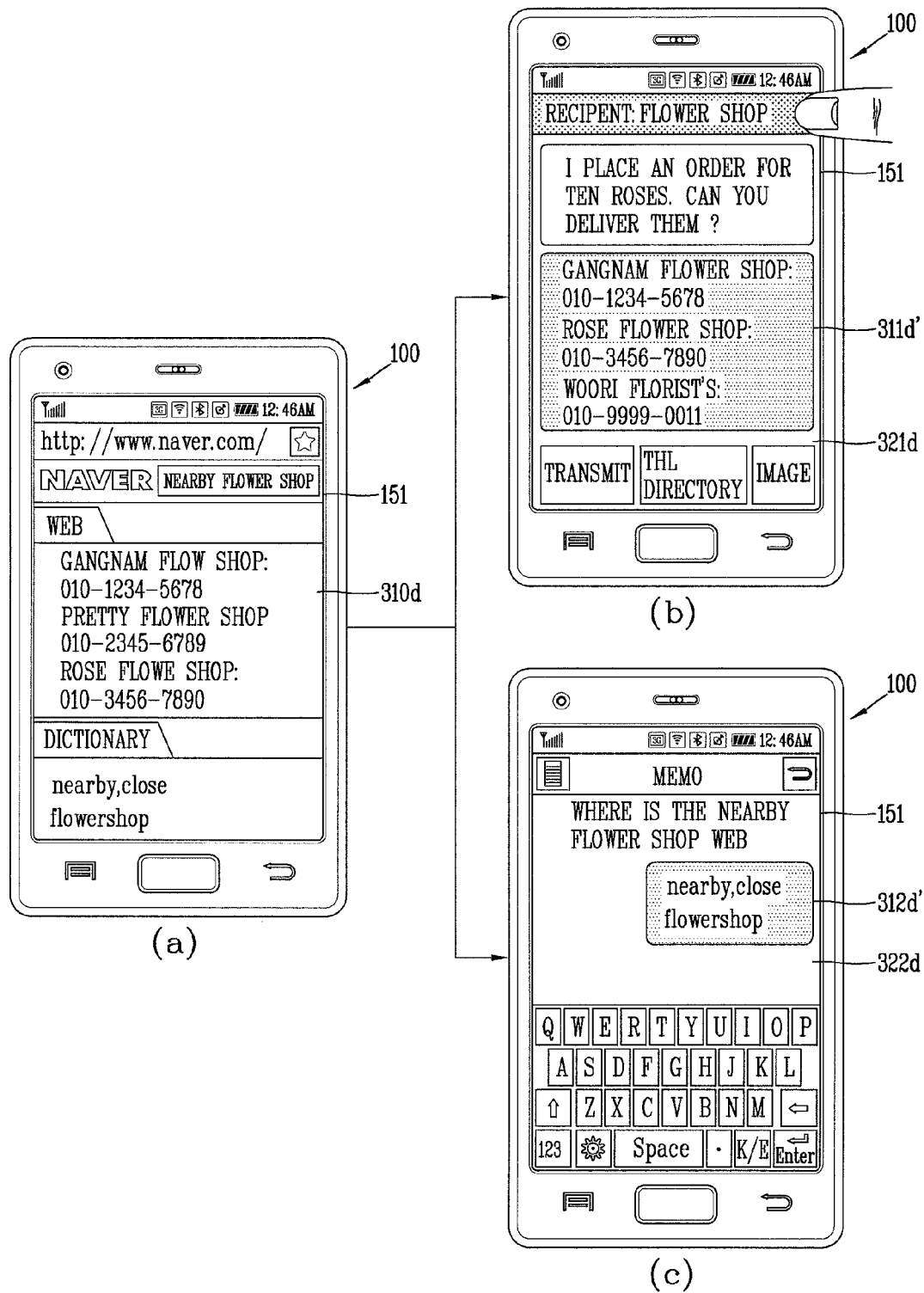

FIGS. 4D(a) to 4D(c) are diagrams for describing a control method in FIGS. 3A and 3B according to another embodiment. Referring to FIG. 4D(a) to 4D(c), a method is described in which the multiple content packs are processed and stored using the first screen information including the multiple items of content, and among the multiple content packs, the content associated with the second screen information is output.

A control method of storing and outputting the content is substantially the same as the control method in FIG. 4A and FIGS. 4B(a) to 4B(d) and the description thereof is omitted referring to FIGS. 3A and 3B and FIG. 4A.

Referring to FIGS. 4D(a) to 4D(c), a first screen information 310d including the web browser screen is output to the display unit 151. For example, the web browser screen may be a screen that results from searching for "NEARBY FLOWER SHOP." The first screen information 310d includes a tab (for web) through which to provide telephone numbers of the flower shops that result from the search and a tab (for dictionary) through which to loop up an English word for 꽃집.

Although not illustrated in the drawing, the controller 180 controls the memory 160 in such a manner that the content included in the first screen information 310d is selectively stored. In addition, the controller 180 controls the memory 160 in such a manner that the multiple items of content included in the first screen information 310d are analyzed and categorized into the multiple content packs.

For example, the two tabs (WEB and DICTIONARY) are designated as two different categories. Items of sub-content included in each category are grouped into a first content pack and a second content pack. The first content pack includes "business names and telephone numbers of flower shops." The second content pack includes "English word for 가깝다 and English word for 꽃집." Thereafter, the controller 180 controls the memory 160 in such a manner that the first and second content packs are stored.

FIG. 4D(b) is a diagram illustrating the display unit 151 on which to display the second screen information 321d defined as the transmitting screen of the message. On the second screen information 321d in FIG. 4D(b), words "I PLACE AN ORDER FOR 10 ROSES. CAN YOU DELIVER THEM?" are output to a window for the contents of the message into which words to be transmitted to the external mobile terminal are input by the user's touch input, and words "FLOWER SHOP" are output to a window for inputting a recipient into which the telephone number of the external mobile terminal, the representative name corresponding to the telephone number, or the like is input.

The controller 180 controls the memory 160 and the display unit 151 in such a manner that at least one of the first content and the second content that are stored in the memory 160 is output to the second screen information 321d.

That is, the controller 180 selects the content pack associated with the second screen information from among the first and second content packs. The second screen information 321d includes words "RECIPIENT, TRANSMIT, ADDRESS DIRECTORY, and IMAGE," and "TRANSMIT, ADDRESS DIRECTORY, and IMAGE" are formed as graphic images into which to input the control command for performing the switch to the next screen.

The controller 180 controls the display unit 151 in such a manner that the first content pack including words "ADDRESS DIRECTION," "RECIPIENT," "ORDER," and "DELIVER" and numerals (for example, 010-1234-5678) that are recognized as the telephone number in association with the graphic image displayed as ADDRESS DIRECTORY is displayed on a content window 311d'.

On the other hand, the second screen information 322d in FIG. 4D(c) corresponds to an execution screen of the memo on which words, an image, or a video image, or the like is recorded based on the user's touch input.

The second screen information 322d includes "WHERE IS THE" and "NEARBY FLOWER SHOP." The controller 180 controls the memory 160 and the display unit 151 in such a manner that the content pack containing the content associated with words including an English word and a Korean word is selected from among the first and second content packs and the selected content pack is output.

Therefore, the controller 180 controls the display unit 151 in such a manner that the second content pack including an English word is displayed on the second content window 312d'.

That is, if the multiple content packs are searched for, one content pack is selected from among the multiple content packs, based on predetermined criteria and the selected content pack is output. According to the present embodiment, if the multiple content packs are created from the first screen information, the content pack associated with the second screen information is selectively output.

Therefore, the user is provided with the associated information that is necessary for the second screen information. Confusion is prevented that results from outputting the multiple items of content.

Figure 5:
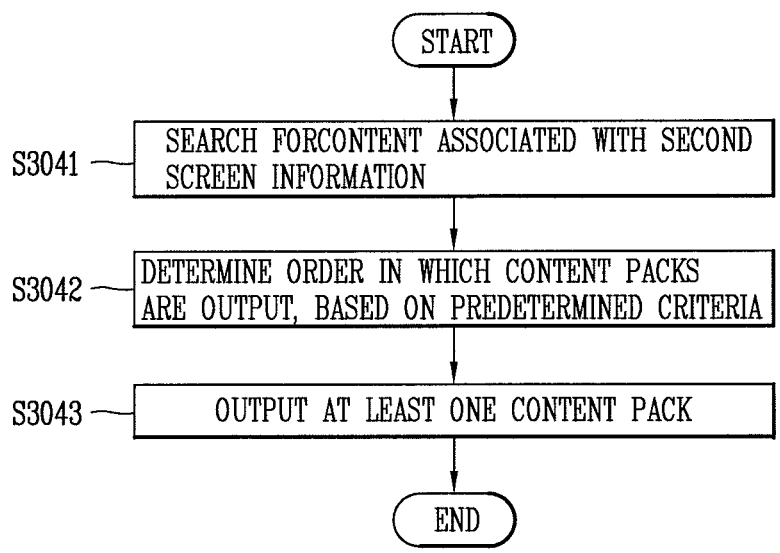
FIG. 5 is a flowchart for describing a control method of outputting multiple items of content according to the order of priority.
Figure 6A:
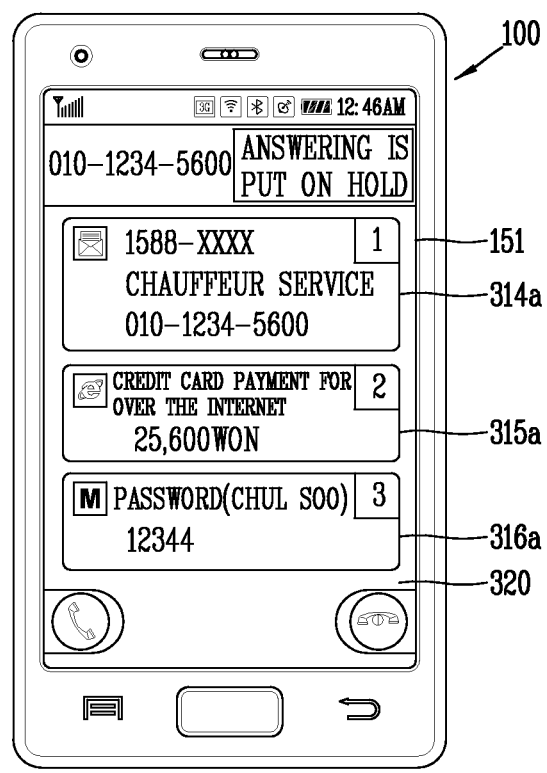
FIGS. 6A and 6E are diagrams for describing control methods in FIG. 5 according to various embodiments.

FIG. 5 is a flowchart for describing a control method of outputting the multiple items of content according to the order of priority. FIGS. 6A and 6E are diagrams for describing control methods in FIG. 5 according to various embodiments.

As described above (refer to FIG. 3B), the multiple items of content included in the first screen information are extracted and processed, and the processed items of content are stored, as at least one content pack, in the memory 160.

Referring to FIG. 5, the memory 160 in which at least one content pack is stored is searched for the content associated with the second screen information (S3041).

The content pack including the content that is substantially the same as, or similar to that of the second screen information 320 is searched for. The content substantially the same as or similar to that of the second screen information 320 means that it is substantially the same as or similar to at least one of the text, the image, the sound, the moving image and the like included in the second screen information 320. Alternatively, the content that is the same in concept as that of the second screen information 320 can be included using the ontology. This is true for the content that is the same as or similar to that of the second screen information 320 in terms of category, information arrangement, or if the content is an image, color impression.

When the multiple content packs associated with the second screen information are searched for, the order in which the content packs are output are determined based on predetermined criteria (S3042). The outputting order is determined in various ways according to the user's setting.

For example, the criteria for determining the outputting order include at least one of the following: a designated date, whether or not to include the same numerals and the extent to which the same numerals are included, whether or not to include the same words and the extent to which the same words are included, whether or not to include an image, the sameness and the similarity in category, the sameness in execution application, and whether or not to correspond to representative content.

When the outputting order is determined, the controller 180 controls the second screen information in such a manner that at least one content pack is sequentially output (S3043).

FIG. 6A is a diagram illustrating an example in which the multiple content packs are together displayed on the display unit 151, according to one embodiment.

If the wireless telephone call signal is received from the external mobile terminal having the telephone number "010-1234-5600," the second screen information 320 is output to the display unit 151. The second screen information 320 includes numerals corresponding to the telephone number described above and includes the graphic image to which to apply the touch input for performing wireless communication with the external mobile terminal.

The controller 180 searches the memory 160, in which the multiple content packs are stored, for the content pack that includes the content associated with numerals "010-1234-5600" corresponding to the telephone number described above.

The controller 180 determines the order in which the content packs resulting from the search are output. For example, the outputting order is determined depending on whether or not to include the same numerals as numerals "010-1234-5600" and on the extent to which the same numerals are included.

For example, the first content pack includes numerals "010-1234-5600," along with words "CHAUFFEUR SERVICE." Numerals and words are the items of content extracted from the received message. The second content pack includes a number "25,600," along with words "CREDIT CARD PAYMENT FOR NOTE BY CREDIT CARD OVER THE INTERNET." A third content pack includes a number "12344," along with words "PASSWORD (CHUL SOO). Number and words are the items of content included in a memo application.

Programs corresponding to the pieces of first screen information from which the first to third content packs are extracted are configured in such a manner that they are different from each other.

The first content pack includes the content in which "010-1234-5600" is the same as in the second screen information. The second content pack includes the content in which "5600" is the same as in the second screen information. The third content pack includes the content in which "1234" is the same as in the second screen information. Therefore, the order in which the first to third content packs are output are determined depending on the extent to which a number in each of the first to third content packs is consistent with that in second screen information.

Referring to FIG. 6A, the controller 180 controls the display unit 151 in such a manner that the first to third content pack stored in the memory 160 are displayed in such a manner as to overlap the second screen information 320.

That is, the controller 180 controls the display unit 151 in such a manner that the first to third content packs are output to first to third content windows 314a, 315a, and 316a, respectively. The first to third content windows 314a, 315a, and 316a each are defined as independent spaces.

Positions on the display unit 151, to which the first to third content windows 314a, 315a, and 316a are output, are determined depending on the outputting order described above. For example, the controller 180 controls the display unit 151 in such a manner that the first to third content windows 314a, 315a, and 316a are sequentially output in the direction from the upper end of the display unit 151 to the lower end in the outputting order described above.

On the other hand, the outputting order is displayed in number on each of the first to third content windows 314a, 315a, and 316a.

The three content windows are displayed on the display unit 151 in the drawings, but this does not impose any limitation. For example, the content windows of which the desirable number depends on the number of the content packs searched for, the category of the second screen information, the region of the second screen information which is provided to the user and the user's setting are displayed.

Accordingly, the user is provided with the multiple items of content associated with the second screen information at the same time.

Figure 6B:
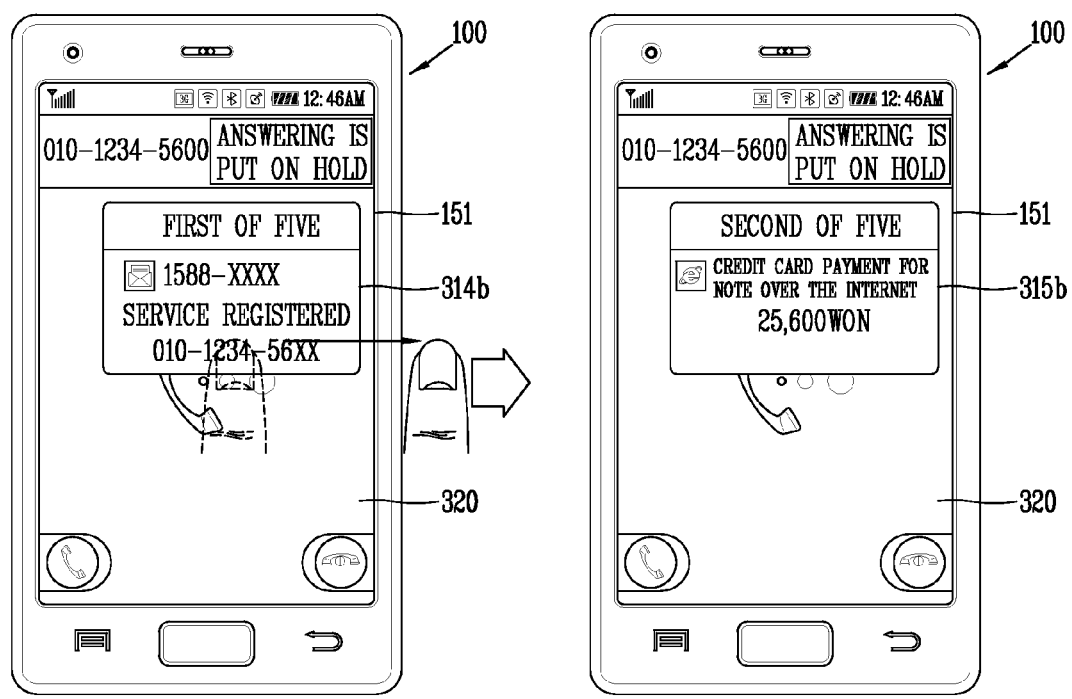

FIG. 6B is a diagram for describing a control method of sequentially outputting the multiple content packs by the touch input applied to the content window.

The controller 180 controls the display unit 151 in such a manner that a first content window 314b on which the first content pack is displayed based on the outputting order is output along with the second screen information 320. That is, one content window is displayed on the display unit 151.

The information as to where the first content pack included in the first content window 314b is among the multiple content packs may be displayed. For example, words "FIRST OF FIVE" are displayed on the first content window 314b.

When the user's touch input is applied to the first content window 314b, the controller 180 controls the display unit 151 in such a manner that the first content window 314b on which the second content pack is displayed is switched to a second content window 315b on which the second content pack is displayed. Words "SECOND of FIVE" are displayed on the second content window 315b.

Although not illustrated in the drawing, the controller 180 controls the display unit 151 in such a manner that a scroll bar is formed on a predetermined content window and the multiple content packs are sequentially output by a user's scroll touch input.

In addition, there is no limitation to a type of touch input. For example, if the scroll touch input, a drag touch input or a long touch input, and a short touch input are applied to the content window, the control is performed in such a manner that the different content packs are output.

The controller 180 performs the control in such a manner that a step of searching for the multiple content packs and determining the outputting order is executed by one process, but this does not impose any limitation. For example, when the touch input is applied to the content window, the controller 180 controls the display unit 151 in such a manner that the memory 160 is searched for the next content pack and the resulting next content pack is output.

According to the present embodiment, the multiple content packs are sequentially output based on the user's control command, and thus a region of the second screen information that has to be veiled to output the multiple content packs are minimized in size.

In addition, when the user obtains the information that he/she wants from the multiple content packs, he/she can perform the control in such a manner that the content pack is additionally provided.

Figure 6C:
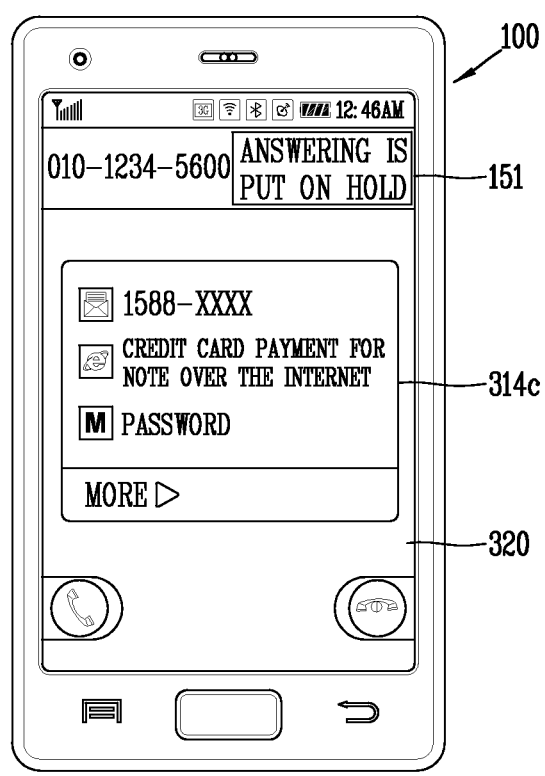

FIG. 6C is a diagram for describing a control method of outputting representative content of each of the multiple content packs on the content window.

If the memory 160 is searched for the content associated with the first screen information, the controller 180 extracts the representative content of each of the multiple content packs that include the content that results from the search. For example, the representative content corresponds to the telephone number of the external mobile terminal that transmits the text message, the name of a commodity, or the subject of a memo.

In addition, the controller 180 controls the display unit 151 in such a manner that the graphic image to which the user's touch input is applied to additionally output the information in the content pack of which the representative content is not output is displayed.

In addition, when the touch input is applied to each representative content, the controller 180 controls the display unit 151 in such a manner that the content pack corresponding to the representative content is output.

According to the present embodiment, the user can check only the representative content of the associated content pack, and thus be provided with the information associated with the second screen information more simply. In addition, because the whole information in the content pack is activated only whenever is necessary, the second screen information can be provided as much as possible.

Figure 6D:
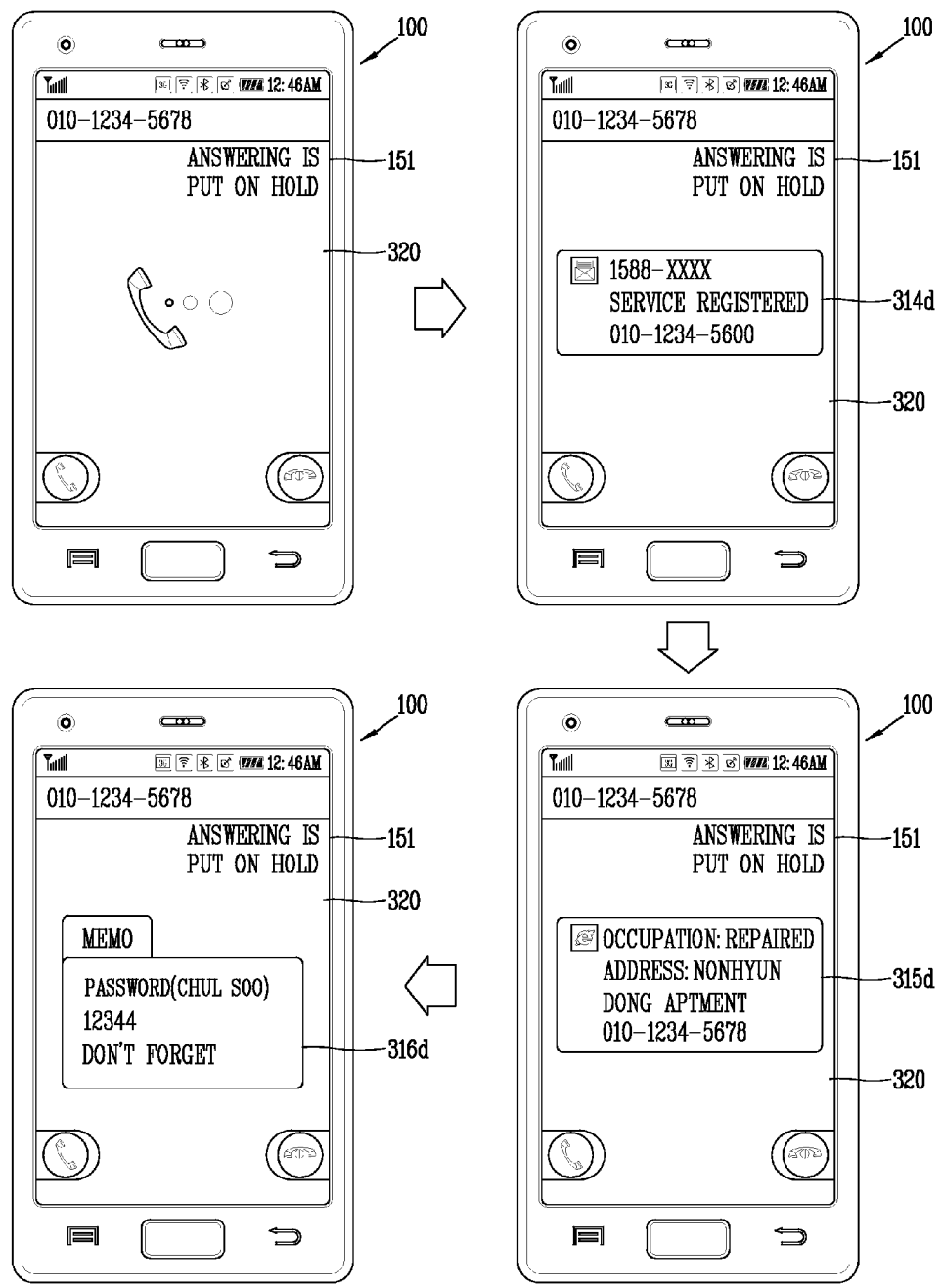
Figure 6E:
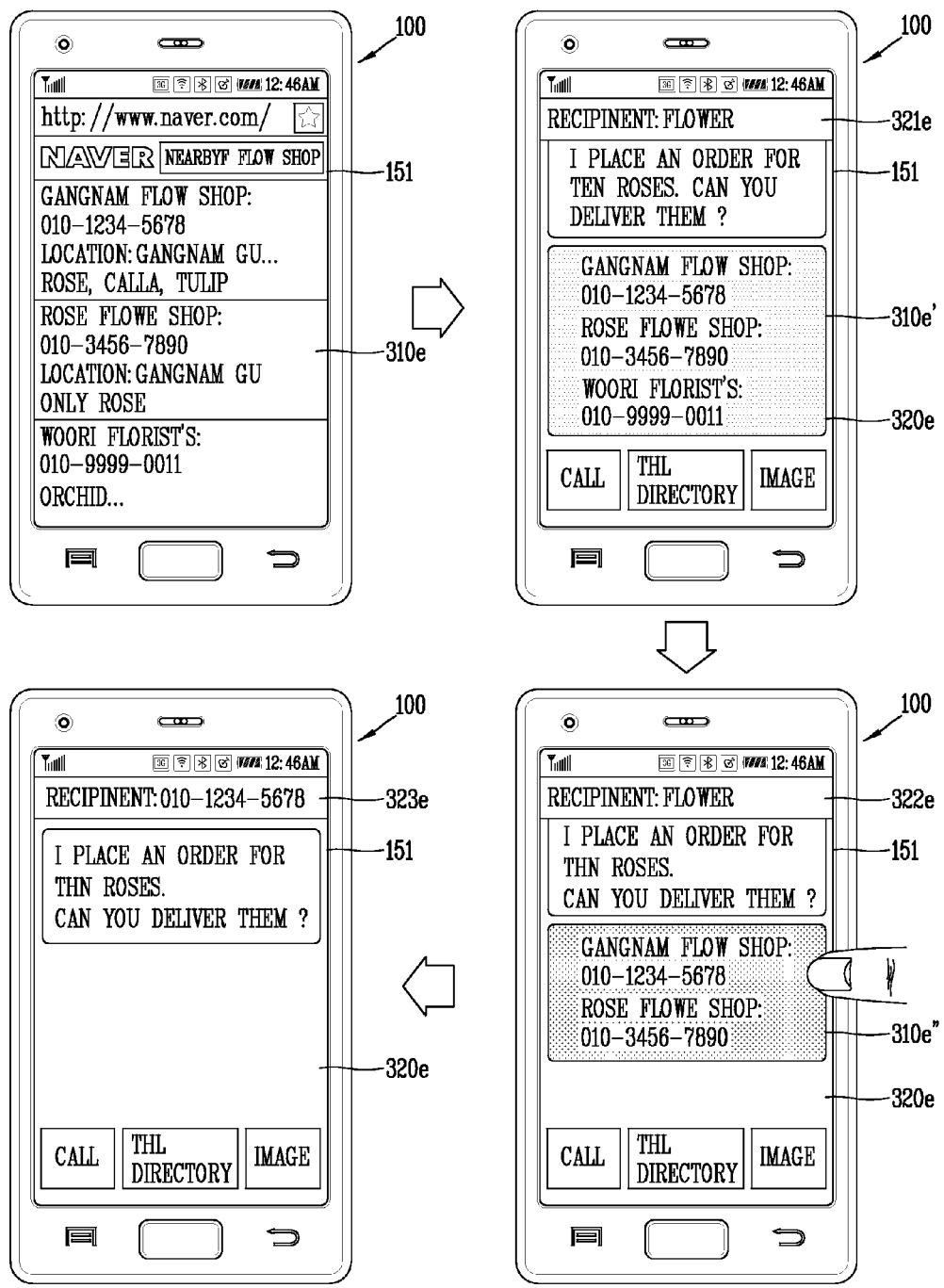

FIG. 6D is a diagram for describing a control method of sequentially outputting the multiple content packs while the second screen information continues to be output.

Referring to FIG. 6D, the second screen information 320 corresponds to a call answering suspension screen through which a call answering is suspended with respect to the wireless telephone call signal received through the wireless communication unit 110. The second screen information 320 includes a number relating to the external mobile terminal that transmits the wireless telephone call signal. The controller 180 controls the display unit 151 in such a manner that the call answering suspension screen is output until the mobile terminal 100 is switched to a telephone conversation mode by application of a user's call answering control command or until transfer of the wireless telephone call signal is limited.

According to the present embodiment, while the second screen information 320 continues to be output, the controller 180 controls the display unit 151 in such a manner that first to third content windows 314d, 315d, and 316d that output the first to third content packs, respectively, are sequentially output.

When the second screen information 320 is output to the display unit 151, the controller 180 controls the display unit 151 in such a manner that the first content window 314d is output to one region of the second screen information 320 in a manner that it overlaps the one region.

The controller 180 controls the display unit 151 in such a manner that the first content window 314d is output for a predetermined time.

Thereafter, the controller 180 controls the display unit 151 in such a manner that the first content window 314d is switched to the second content window 315d. Then, the controller 180 controls the display unit 151 in such a manner that when the predetermined time elapses, the second content window 315d is switched to the third content window 316d.

On the other hand, if the second screen information is switched to a different screen information by the user or the external environment, the controller 180 limits the outputting of the content window.

The first to third content windows 314d, 315d, and 316d are realized in such a manner that they are different in form. The first to third content windows are set in such a manner that they are different in the period of time when the outputting of the content window is maintained.

It is preferable that the first to third content windows 314d, 315d, and 316d be sequentially output in the outputting order, but this does not impose any limitation. In addition, the period of time for which the outputting of the content window is maintained may be controlled based on the outputting order.

According to the present embodiment, if the second screen information continues to be output, the user can be sequentially provided with various content without having to execute his/her control command. In addition, the multiple content packs are not output at a time. Thus, the region that the second screen information overlaps can be minimized in size.

FIG. 6E is a diagram for describing a control method in which the control is performed in such a manner that if at least one part of the second screen information is changed, the content that is output is accordingly changed.

A first screen information 310e in FIG. 6E corresponds to a screen that results from searching for NEARBY FLOW SHOP through the use of the web browser and outputting the result of the search using the web browser. The first screen information 310e includes business names and telephone numbers of flower shops.

A second screen information 320e corresponds to the message transmitting screen. The second screen information 320e includes a contents-input window into which the contents of the message is input and a number-input window 321e in which the telephone number of the recipient.

When words are output to the number-input window 321e, based on the user's touch input, the controller 180 controls the display unit 151 in such a manner that content associated with "FLOWER" is searched for and the content that results from the search is output to a content window 310e'.

The content described above corresponds to "GANGNAM FLOWER SHOP," "ROSE FLOWER SHOP," and "WOORI FLORIST'S" and a telephone number corresponding to each.

When words "FLOWER SHOP" are output to the number-input window 321e by the user's touch input, the controller 180 controls the display unit 151 in such a manner that "GANGNAM FLOWER SHOP" and "ROSE FLOWER SHOP," and the telephone number corresponding to each are output to the content window 310e' and "WOORI FLORIST'S" and the telephone number corresponding to it are limited.

That is, as the second screen information 320e gets narrower in scope, so the content associated with the second screen information 320e gets also narrower in scope. In this manner, the controller 180 can impose limitation on the outputting of the content with a low degree of association, based on predetermined criteria.

Therefore, the user can be provided with the second screen information and the information with a higher degree of association.

FIGS. 7A to 7D are diagrams for describing a method in which the mobile terminal is controlled based on the touch input applied to the content window.

The second screen information 320f illustrated in FIGS. 7A to 7D includes words corresponding to the external mobile terminal transmitted to and from the external mobile terminal through the wireless communication unit 110. The controller 180 controls the display unit 151 in such a manner that the memory 160 is searched for the content pack associated with one or more words included in the second screen information 320f. Accordingly, the display unit 151 outputs a content window 310f on which to display the content pack described above to at least one region of the second screen information 320f.

The content window 310f according to the present embodiment is realized as a control window to which the user's touch input is applied to control the mobile terminal 100. In addition, the content window 310f includes a sub-controller 180 that controls the mobile terminal 100 in the different manner of execution than the controller 180.

Figure 7:
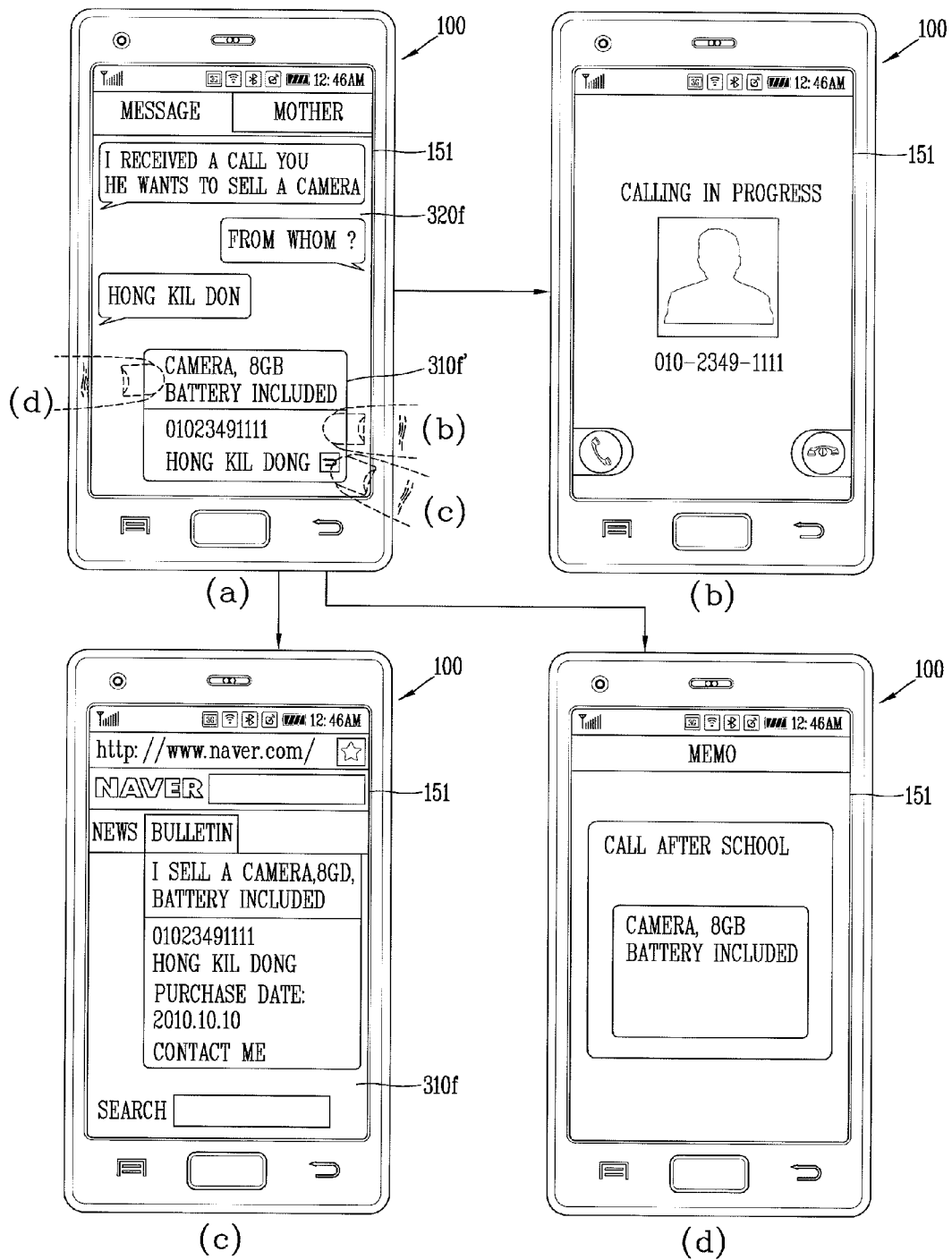
FIGS. 7A to 7D are diagrams for describing a method in which the mobile terminal is controlled based on the touch input applied to the content window.

Referring to FIGS. 7A and 7B, when the touch input is applied to a region of the content window 301f, to which a telephone number 01023491111 is output, the controller 180 switches the mobile terminal 100 to the telephone call mode. That is, the controller 180 controls the wireless communication unit 110 in such a manner that the mobile terminal 100 transmits the wireless telephone call signal to the external mobile terminal that has the telephone number described above. The controller 180 controls the display unit 151 in such a manner that the second screen information 302f is switched to the transmitting screen including the telephone number 010-2349-1111, which alerts the user that the transmitting is in progress.

Referring to FIGS. 7A and 7C, when the touch input is applied to the graphic image displayed on the content window 310f', the controller 180 controls the display unit 151 in such a manner that a first screen information 310f including the content described above is output.

That is, an initial screen information at the time of the extraction of the content described above is provided. For example, if the first screen information 310f is a web browser screen, the graphic image is set in such a manner that it is linked to an URL address of the web browser screen.

That is, the controller 180 controls the storage unit in such a manner that the content that is output as words from the information 310f is stored and at the same time, a web address from which the first screen information 310f is output is stored.

Referring to FIGS. 7A and 7D, when the touch input is applied to the content window 310f', the controller 180 performs the control in such a manner that the content described above is copied. The touch input may be the long touch input.

The control is performed in such a manner that a copy of the content described above is output to the execution screen of the memo into which the word can be input.

According to the present embodiments, the function associated with the content described above is executed using the content window from which the content described above is output. Therefore, without any effort to remember the content that the user has to remember, he/she can use it back.

Figure 8:
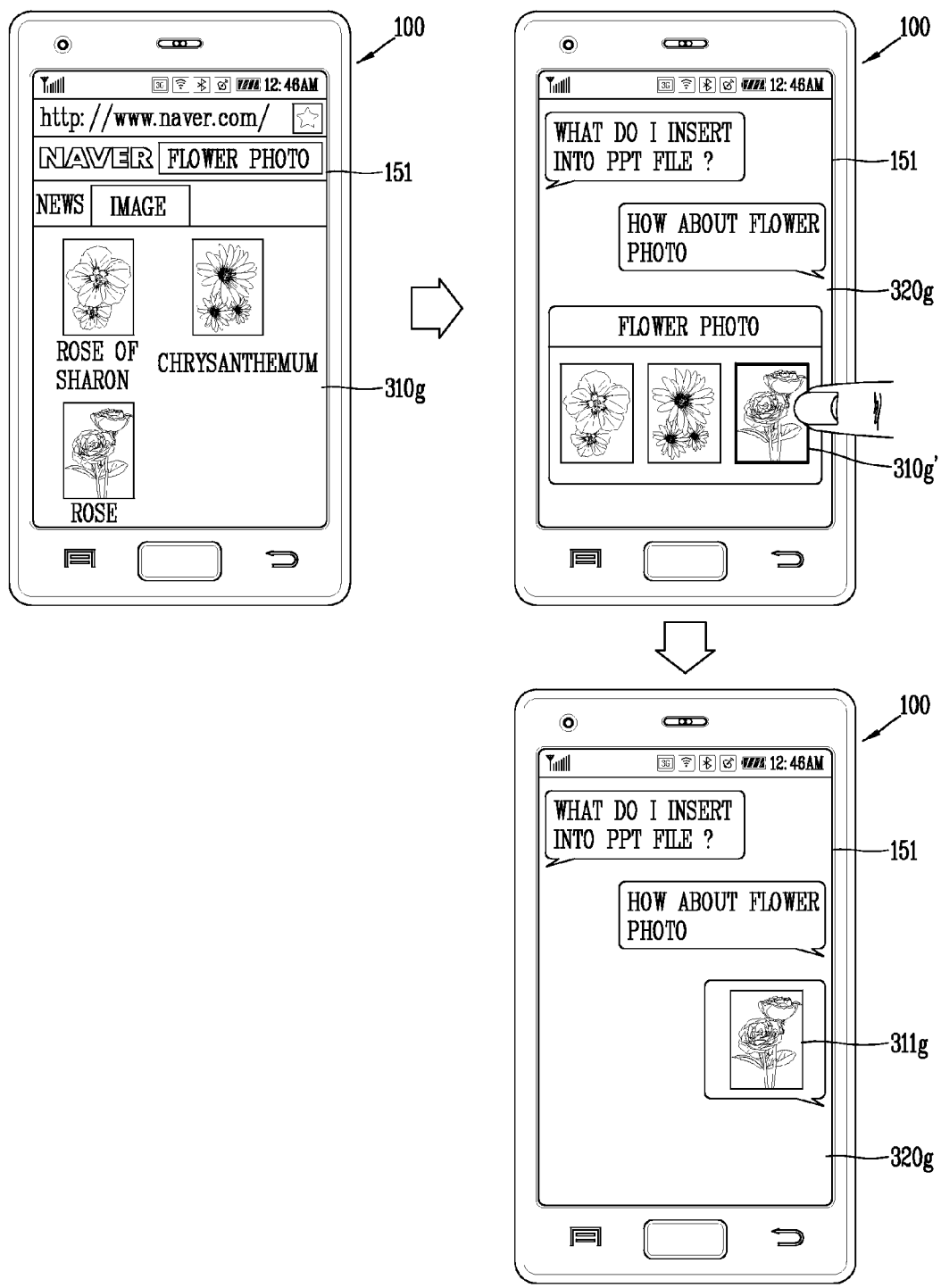
FIG. 8 is a diagram for describing a control method in which the mobile terminal is controlled based on a touch input applied to a content window.

FIG. 8 is a diagram for describing a control method in which the mobile terminal is controlled based on the touch input applied to the content window.

A first screen information 310g in FIG. 8 corresponds to a screen that results from searching for "FLOWER PHOTO" using the web browser. The first screen information 310g includes not only words but also multiple images.

The controller 180 controls the display unit 151 in such a manner that the image associated with a second screen information 320g is displayed on a content window 310g'. That is, the content described above includes not only words, but also images, moving images, and the like.

When the touch input is applied to the content window 310g', the controller 180 controls the display unit 151 in such a manner that the touch-input content is included in the second screen information 320g. In addition, when the touch input is applied, the controller 180 controls the display unit 151 in such a manner that the content window 310g' disappear.

For example, the second screen information 320g corresponds to the execution screen of the memo, a message creation screen, or the like, to which the control command to input data is applied.

According to the embodiment of the present invention, the content that is output to the content window is directly recorded.

Figure 9A:
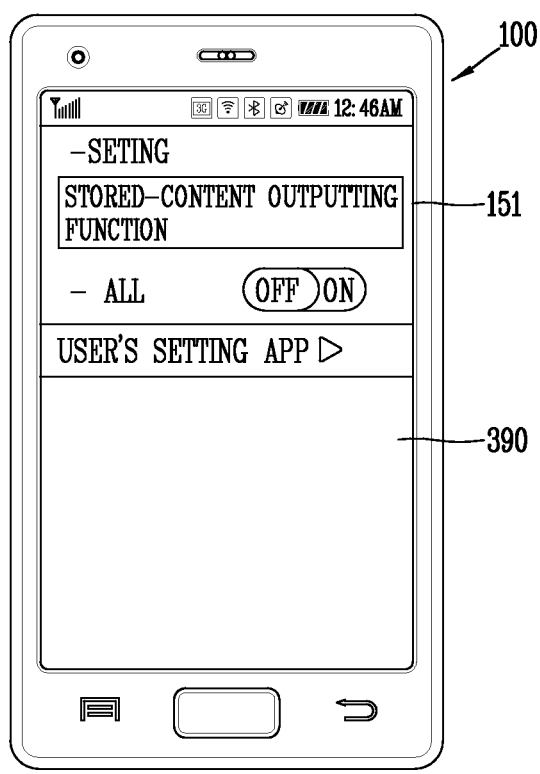
FIGS. 9A and 9B are diagrams for describing a method of controlling the outputting of the content window.
Figure 9B:
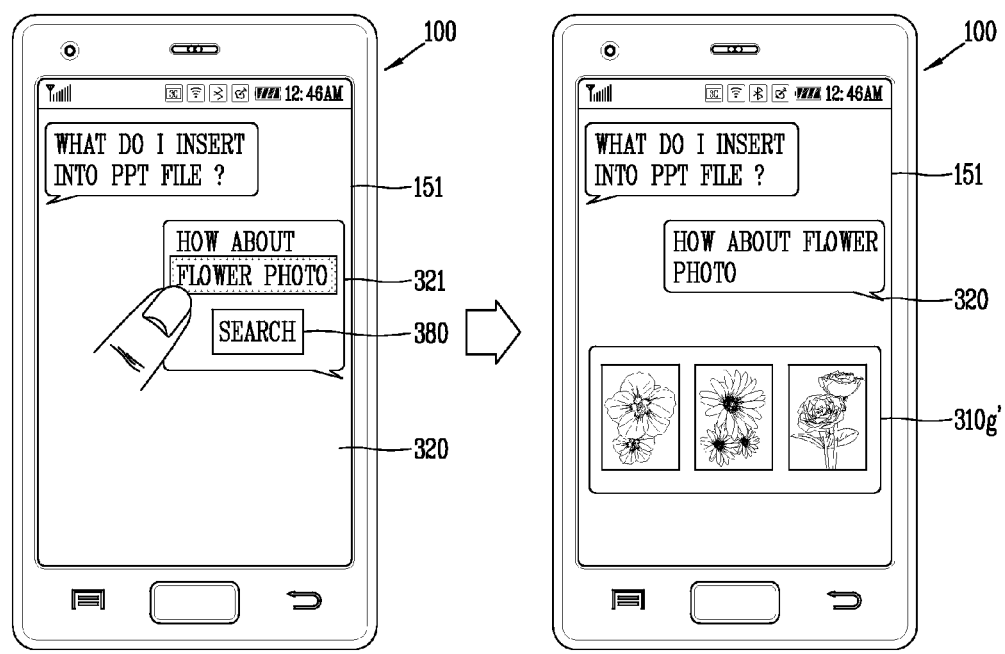

FIGS. 9A and 9B are diagrams for describing a method of controlling the outputting of the content window.

FIG. 9A is a diagram illustrating a setting window, which is referred to when describing a method of setting the outputting of the content window.

A setting window 390 includes a command input window into which the control command is input to activate or deactivate a function of outputting the stored content.

In addition, the setting window 390 includes the command input window into which the control command is input to activate the function of outputting the stored content with respect to every application executable on the mobile terminal 100.

FIG. 9B is a diagram for describing a method in which the control is performed in such a manner that the content is output based on the user's touch input.

Referring to FIG. 9B, the controller 180 controls the display unit 151 in such a manner that a search icon 380 is output based on the touch input applied to one region of the second screen information 320. The controller 180 controls the display unit 151 in such a manner that when the touch input is applied to the search icon 380, the memory 260 in which the items of content are stored is searched for the content associated with one region of the second screen information 320 and the content window 310g' is output in such a manner as to partly overlap the second screen information 320.

The search icon 380 is output adjacent to one region of the second screen information 320 to which the touch input is applied. The touch input applied to the second screen information 320 may be the long touch input.

Accordingly, the user is provided with only the content associated with specific information included in the second screen information 320. Therefore, the user is provided with the content with a higher degree of association more speedily.

Figure 10A:
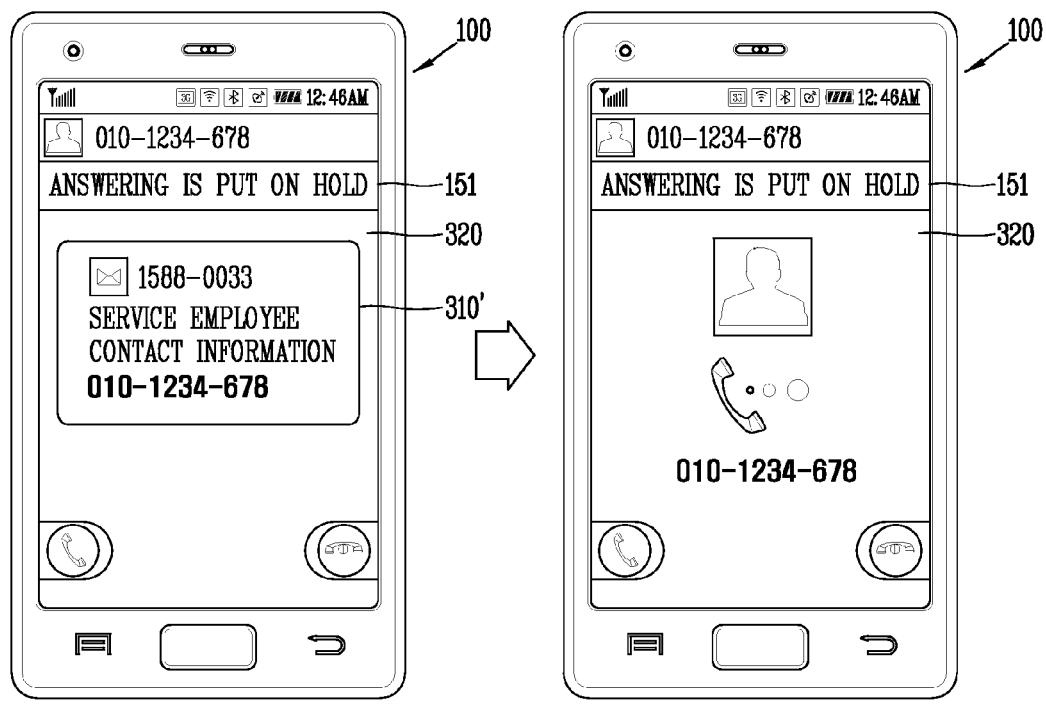
FIGS. 10A to 10C are diagrams for describing a form in which the content window is output to a display unit.
Figure 10B:
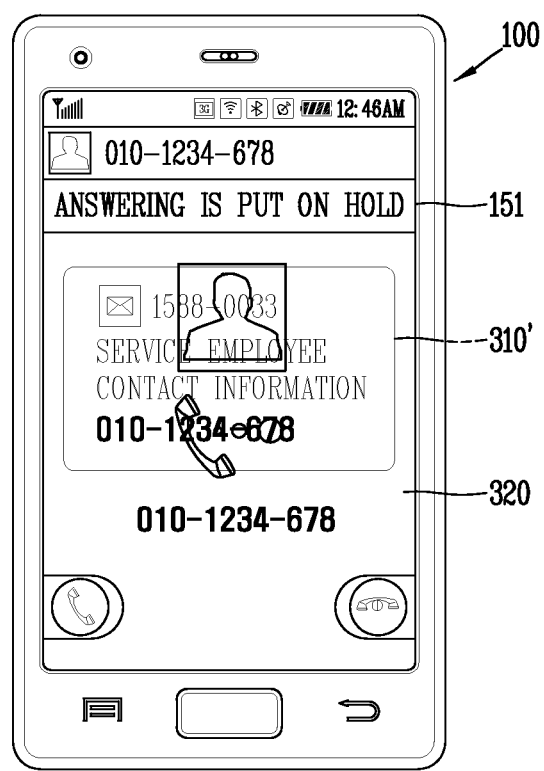
Figure 10C:
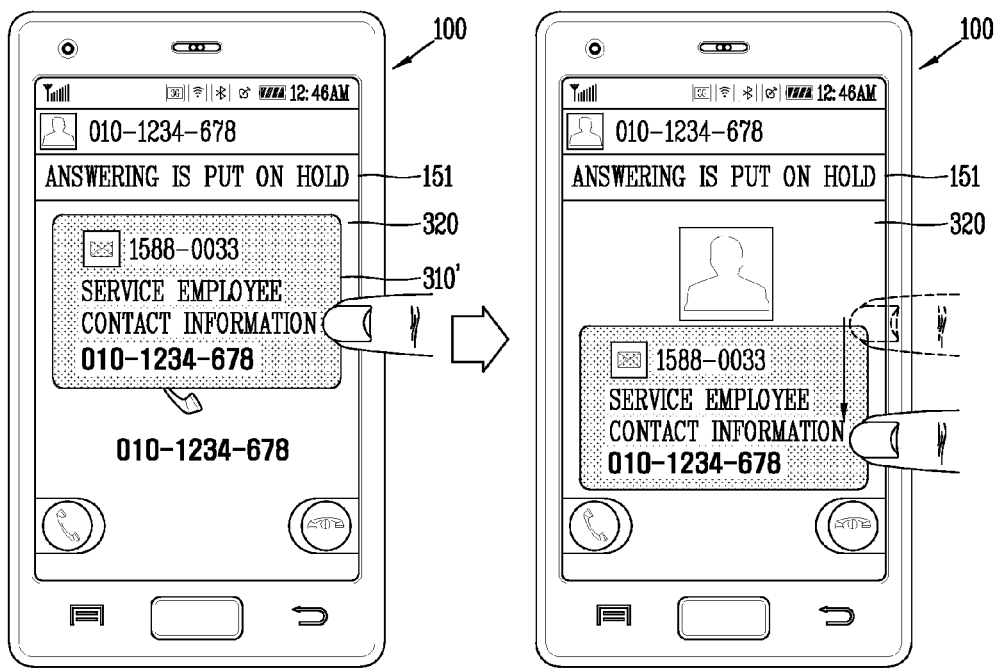

FIGS. 10A to 10C are diagrams for describing a form in which the content window is output to the display unit.

Referring to FIG. 10A, the controller 180 controls the display unit 151 in such a manner that the content window 310' is output in such a manner as to partly overlap the second screen information 320 and when a predetermined time elapses, the content window 310' disappears.

When the predetermined time elapses, the user recognizes the contents of the content displayed on the content window 310'. Thereafter, the second screen information 320 is transferred more exactly.

In addition, the controller 180 controls the display unit 151 in such a manner that the content window 310' is repeatedly output and disappears at predetermined time intervals.

Referring to FIG. 10B, the content window 310' is displayed in an opaque manner. That is, the content window 310' is displayed in such a manner as to overlap one region of the second screen information 320, but the user can recognizes the second screen information 320 on the overlapped region.

Referring to FIG. 10C, a position of the content window 310' on the display unit 151 is changed based on the user's touch input.

Accordingly, the region of the second screen information 320, which is overlapped by the content window 310', returns back to its original state by moving the position of the content window 310'.

A problem of veiling one part of the second screen information 320 is solved by changing the form of the content window 310' in various ways. The form of the content window 310' is not limited to one illustrated in the drawings.

The configuration and the method relating to the mobile terminal 100 described above according to the embodiments are not applied in a limiting manner, but all of or some of the embodiments may be selectively combined with each other to create various modifications to the embodiments.

The configuration and the method relating to the mobile terminal 100 described above according to the embodiments are not applied in a limiting manner, but all of or some of the embodiments may be selectively combined with each other to create various modifications to the embodiments.

According to the present invention, the user can be provided back with the information with which he/she has previously provided, without having to search for it. This removes inconvenience of the recording of the information. The user does not need to remember the information with which he/she has been provided.

In addition, since the content associated with the screen information that is currently output is searched for and the result of the search is output, the user can be speedily provided with the necessary information in real time.

In addition, since much information is structured and is provided in the form of content pack, the user can be provided with higher-improved quality information.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
    a display unit configured to display first screen information including multiple items of content;
    a memory configured to store multiple content packs formed from the multiple items of content in the displayed first screen information, each content pack including a different combination of content included in the multiple items of content; and
    a controller configured to:
    display second screen information different from the first screen information on the display unit based on a control command, the second screen information having at least one of letters, symbols, voice, sound, images and video images,
    search multiple content packs including content associated with at least one of letters, symbols, voice, sound, images and video images when the second screen information is displayed,
    display at least one portion of the searched multiple content packs on the second screen information,
    extract content from the multiple items of content included in the first screen information, based on a predetermined extraction criteria,
    analyze the extracted content, structure the analyzed content by category, and process the structured content to form each content pack,
    store the formed multiple content packs, and
    determine a time-based outputting order in which the multiple content packs are displayed on the display unit based on a predetermined criteria.

2. The mobile terminal of claim 1, wherein the controller is further configured to process the structured content into a content pack using ontology with respect to at least one part of the displayed second screen information.

3. The mobile terminal of claim 1, wherein the extracted content includes data that is consistent with the second screen information.

4. The mobile terminal of claim 1, wherein the controller is further configured to sequentially display the multiple content packs on the second screen information in response to a touch input applied to the display unit.

5. The mobile terminal of claim 1, wherein the controller is further configured to selectively display at least one of the multiple content packs according to a category of the second screen information.

6. The mobile terminal of claim 1, wherein the controller is further configured to:
    display the multiple content packs in individual display windows, and
    display partial portions of contents included in a corresponding content pack in response to a touch input on the corresponding content packet.

7. The mobile terminal of claim 1, wherein the controller is further configured to display the multiple content packs on the display unit based on the determined outputting order.

8. The mobile terminal of claim 1, wherein the predetermined criteria corresponds to at least whether or not content included in a corresponding content pack includes data that is consistent with one part of the second screen information, or whether or not an amount of the data and the second screen information are consistent with the category of the content.

9. The mobile terminal of claim 1, wherein the controller is further configured to display the multiple content packs together on the display unit.

10. The mobile terminal of claim 1, wherein the controller is further configured to:
    display the multiple content packs in individual display windows that overlap one region of the second screen information, and
    change a form of a corresponding content window based on a user's control command applied to the display unit or by user's setting.

11. The mobile terminal of claim 1, wherein the second screen information corresponds to an execution screen of any one of multiple programs, and
    wherein if the second screen information corresponding to a predetermined specific program among the multiple programs is displayed, the controller is further configured to output the content associated with the second screen information.

12. The mobile terminal of claim 1, wherein the controller is further configured to:
    receive a touch input applied to one region of the display unit on which data included in the second screen information is displayed, and
    display a corresponding multiple pack including the content associated with the data.

13. The mobile terminal of claim 1, wherein the items of content include at least one of a letter, a symbol, voice, sound, an image, and a video image.

14. A method of controlling a mobile terminal, the method comprising:
    displaying, via a display unit of the mobile terminal, first screen information including multiple items of content;
    storing, via a memory associated with the mobile terminal, multiple content packs formed from the multiple items of content in the displayed first screen information, each content pack including a different combination of content included in the multiple items of content;
    displaying, via a controller of the mobile terminal, second screen information different from the first screen information on the display unit based on a control command, wherein the second screen information has at least one of letters, symbols, voice, sound, images and video images;

searching multiple content packs including content associated with at least one of letters, symbols, voice, sound, images and video images when the second screen information is displayed;

displaying at least one portion of the searched multiple content packs on the second screen information, extract content from the multiple items of content included in the first screen information, based on a predetermined extraction criteria, analyze the extracted content, structure the analyzed content by category, and process the structured content to form each content pack, store the formed multiple content packs, and determine a time-based outputting order in which the multiple content packs are displayed on the display unit based on a predetermined criteria.

15. The method of claim 14, further comprising:

applying a touch input to the display unit; and switching the second screen information to the first screen information.

\* \* \* \* \*